(12) United States Patent
Vaughan et al.

(10) Patent No.: US 12,379,770 B2
(45) Date of Patent: Aug. 5, 2025

(54) INTEGRATED SENSOR FRAMEWORK FOR MULTI-DEVICE COMMUNICATION AND INTEROPERABILITY

(71) Applicant: Apple Inc., Cupertino, CA (US)

(72) Inventors: Richard T. Vaughan, Saratoga, CA (US); Jamil Dhanani, San Francisco, CA (US); Juan C. Garcia, San Francisco, CA (US); Seyedmehdi Mohaimenianpour, Cupertino, CA (US); Geoffrey Nagy, Cupertino, CA (US); Timothy S. Paek, Mercer Island, WA (US); Naga Rama Abhishek Pratapa, Seattle, WA (US); Muhammad Amir Shafiq, Redmond, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/371,990

(22) Filed: Sep. 22, 2023

(65) Prior Publication Data

US 2024/0118744 A1 Apr. 11, 2024

Related U.S. Application Data

(60) Provisional application No. 63/408,985, filed on Sep. 22, 2022.

(51) Int. Cl.
*G06F 3/01* (2006.01)
*G06T 7/20* (2017.01)
(Continued)

(52) U.S. Cl.
CPC ............. *G06F 3/011* (2013.01); *G06T 7/20* (2013.01); *G06T 7/70* (2017.01); *G06T 17/00* (2013.01);
(Continued)

(58) Field of Classification Search
CPC ... G06F 3/011; G06T 7/70; G06T 7/20; G06T 17/00; G06T 2207/30241; G06T 2207/30244; G06V 40/10; G06V 20/50
See application file for complete search history.

(56) References Cited

U.S. PATENT DOCUMENTS 7,599,918 B2 10/2009 Shen et al.
7,603,684 B1 10/2009 Ellis
(Continued)

FOREIGN PATENT DOCUMENTS

CN 101833286 A 9/2010
CN 102882752 A 1/2013
(Continued)

OTHER PUBLICATIONS

Accessibility on iOS, Apple Inc., online available at: https://developer.apple.com/accessibility/ios/, Retrieved on Jul. 26, 2021, 2 pages.
(Continued)

*Primary Examiner* — Robert J Michaud
(74) *Attorney, Agent, or Firm* — DLA Piper LLP (US)

(57) ABSTRACT

Systems and processes for an integrated sensor framework are provided. For example, a first electronic device receives at least one input including sensor data from a second device. A representation of a physical environment associated with the first electronic device is obtained based on sensor data from the first electronic device and the sensor data from the second device. Movement information corresponding to movement of an object within the physical environment is identified. Event information is determined corresponding to activity within the physical environment, wherein the event information is determined based on the identified movement information and the representation of the physical environment. Accordingly, an output is provided to the user based on the event information.

42 Claims, 23 Drawing Sheets

(51) Int. Cl.
*G06T 7/70* (2017.01)
*G06T 17/00* (2006.01)
*G06V 20/50* (2022.01)
*G06V 40/10* (2022.01)

(52) U.S. Cl.
CPC ............. *G06V 20/50* (2022.01); *G06V 40/10* (2022.01); *G06T 2207/30241* (2013.01); *G06T 2207/30244* (2013.01)

(56) References Cited

U.S. PATENT DOCUMENTS

| | | |
|---|---|---|
| 8,654,936 B1 | 2/2014 | Eslambolchi et al. |
| 8,762,156 B2 | 6/2014 | Chen |
| 9,628,844 B2 | 4/2017 | Conrad et al. |
| 9,646,313 B2 | 5/2017 | Kim et al. |
| 9,747,083 B1 | 8/2017 | Roman et al. |
| 9,760,566 B2 | 9/2017 | Heck et al. |
| 9,842,168 B2 | 12/2017 | Heck et al. |
| 9,978,180 B2 | 5/2018 | Margolis et al. |
| 10,147,421 B2 | 12/2018 | Liddell et al. |
| 10,180,572 B2 | 1/2019 | Osterhout et al. |
| 10,339,721 B1 | 7/2019 | Dascola et al. |
| 10,437,928 B2 | 10/2019 | Bhaya et al. |
| 10,489,651 B2 | 11/2019 | Luccin et al. |
| 10,496,364 B2 | 12/2019 | Yao |
| 10,642,934 B2 | 5/2020 | Heck et al. |
| 10,691,473 B2 | 6/2020 | Karashchuk et al. |
| 11,043,086 B1 | 6/2021 | Daoura et al. |
| 11,223,699 B1 | 1/2022 | Niewczas |
| 2010/0127854 A1 | 5/2010 | Helvick et al. |
| 2010/0318357 A1 | 12/2010 | Istvan et al. |
| 2010/0332235 A1 | 12/2010 | David |
| 2012/0232886 A1 | 9/2012 | Capuozzo et al. |
| 2013/0024910 A1 | 1/2013 | Verma et al. |
| 2013/0035086 A1 | 2/2013 | Chardon et al. |
| 2013/0080177 A1 | 3/2013 | Chen |
| 2013/0183944 A1 | 7/2013 | Mozer et al. |
| 2014/0006483 A1 | 1/2014 | Garmark et al. |
| 2014/0006947 A1 | 1/2014 | Garmark et al. |
| 2014/0045547 A1 | 2/2014 | Singamsetty et al. |
| 2014/0057610 A1 | 2/2014 | Olincy et al. |
| 2014/0067702 A1 | 3/2014 | Rathod |
| 2014/0098247 A1 | 4/2014 | Rao et al. |
| 2014/0129006 A1 | 5/2014 | Chen et al. |
| 2014/0145914 A1 | 5/2014 | Latta et al. |
| 2014/0163751 A1 | 6/2014 | Davis et al. |
| 2014/0330951 A1 | 11/2014 | Sukoff et al. |
| 2015/0045007 A1 | 2/2015 | Cash |
| 2015/0067811 A1* | 3/2015 | Agnew ............... H04L 63/0281 726/9 |
| 2015/0088518 A1 | 3/2015 | Kim et al. |
| 2015/0140990 A1 | 5/2015 | Kim et al. |
| 2015/0162006 A1 | 6/2015 | Kummer |
| 2015/0170073 A1 | 6/2015 | Baker |
| 2015/0193005 A1 | 7/2015 | Di et al. |
| 2015/0193018 A1 | 7/2015 | Venable et al. |
| 2015/0309691 A1 | 10/2015 | Seo et al. |
| 2015/0317831 A1 | 11/2015 | Ebstyne et al. |
| 2015/0317832 A1 | 11/2015 | Ebstyne et al. |
| 2016/0080165 A1 | 3/2016 | Ehsani et al. |
| 2016/0234206 A1 | 8/2016 | Tunnell et al. |
| 2016/0283455 A1 | 9/2016 | Mardanbegi et al. |
| 2017/0264451 A1 | 9/2017 | Yu et al. |
| 2018/0054505 A1 | 2/2018 | Hart et al. |
| 2018/0102914 A1 | 4/2018 | Kawachi et al. |
| 2018/0221783 A1 | 8/2018 | Gamero |
| 2019/0065027 A1* | 2/2019 | Hauenstein ............. G06F 3/011 |
| 2019/0138268 A1 | 5/2019 | Andersen et al. |
| 2019/0188895 A1 | 6/2019 | Miller et al. |
| 2019/0228581 A1 | 7/2019 | Dascola et al. |
| 2019/0287522 A1 | 9/2019 | Lambourne et al. |
| 2019/0324533 A1 | 10/2019 | Itkowitz et al. |
| 2020/0112454 A1 | 4/2020 | Brown et al. |
| 2020/0298394 A1 | 9/2020 | Han et al. |
| 2020/0312318 A1* | 10/2020 | Olson ................... G10L 15/22 |
| 2022/0277505 A1 | 9/2022 | Baszucki et al. |
| 2023/0409174 A1 | 12/2023 | Liang et al. |
| 2023/0409179 A1 | 12/2023 | Liang et al. |

FOREIGN PATENT DOCUMENTS

| | | |
|---|---|---|
| CN | 103035240 A | 4/2013 |
| CN | 103365279 A | 10/2013 |
| CN | 103475551 A | 12/2013 |
| CN | 103477592 A | 12/2013 |
| CN | 104820488 A | 8/2015 |
| CN | 107003738 A | 8/2017 |
| EP | 2938022 A1 | 10/2015 |
| EP | 3036594 A2 | 6/2016 |
| IN | 2011MU01369 A | 7/2011 |
| JP | 2009-110300 A | 5/2009 |
| JP | 2013-73240 A | 4/2013 |
| JP | 2014-60600 A | 4/2014 |
| KR | 10-1506510 B1 | 3/2015 |
| KR | 10-2015-0041974 A | 4/2015 |
| TW | M348993 U | 1/2009 |
| WO | 2015/053485 A1 | 4/2015 |
| WO | 2016/027933 A1 | 2/2016 |
| WO | 2016/089638 A1 | 6/2016 |
| WO | 2018/009397 A1 | 1/2018 |
| WO | 2018/213401 A1 | 11/2018 |

OTHER PUBLICATIONS

Apple, "Apple previews innovative accessibility features combining the power of hardware, software, and machine learning", Available online at: https://www.apple.com/newsroom/2022/05/apple-previews-innovative-accessibility-features/, May 17, 2022, 10 pages.
Ashbrook Daniell., "Enabling Mobile Micro interactions", Retrieved from the Internet: URL: http://danielashbrook.com/wp-content/uploads/2012/06/2009-Ashbrook-Thesis.pdf, May 2010, 186 pages.
Ask Alexa—Things That Are Smart Wiki, Available online at: <http://thingsthataresmart.wiki/index.php?title=Ask_Alexa&oldid=4283>, Jun. 8, 2016, pp. 1-31.
Bell Jason, "Machine Learning Hands-On for Developers and Technical Professionals", Wiley, Nov. 3, 2014, 82 pages.
DIRECTV™ Voice, Now Part of the DIRECTTV Mobile App for Phones, Sep. 18, 2013, 5 pages.
Gomes et al., "Mining Recurring Concepts in a Dynamic Feature Space", IEEE Transactions on Neural Networks and Learning Systems, vol. 25, No. 1, Jul. 31, 2013, pp. 95-110.
Guo et al., "Viz Lens: A Robust and Interactive Screen Reader for Interfaces in the Real World", In Proceedings of the 29th Annual Symposium on User Interface Software and Technology (UIST '16), Tokyo, Japan, online available at: https://dl.acm.org/doi/pdf/10.1145/2984511.2984518, Oct. 16-19, 2016, pp. 651-664.
Gupta Naresh, "Inside Bluetooth Low Energy", Artech House, Mar. 1, 2013, 274 pages.
Iclarified, "How to Use Voice Control on Your iPhone 3GS", Online Available at: <https://www.iclarified.com/4296/how-to-use-voice-control-on-your-iphone-3g-s>, Jun. 19, 2009, 16 pages.
Interactive Voice, available at <http://www.helloivee.com/company/>, retrieved on Feb. 10, 2014, 2 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, pp. 1-13.
Kumar Shiu, "Ubiquitous Smart Home System Using Android Application", International Journal of Computer Networks & Communications (IJCNC) vol. 6, No. 1, Available online at: https://arxiv.org/ftp/arxiv/papers/1402/1402.2114.pdf, Jan. 2014, pp. 33-43.
Loukides et al., "What Is the Internet of Things?", O'Reilly Media, Inc., Online Available at: https://www.oreilly.com/library/view/what-is-the/9781491975633/, Jan. 13, 2015, 31 pages.
Nuance Dragon Naturally Speaking, Version 13 End-User Workbook, Nuance Communications, Inc. Online Available at: https://www.nuance.com/content/dam/nuance/en_us/collateral/dragon/guide/gd-dragon-naturally-speaking-13-workbook-en-us.pdf, Sep. 2014, 125 pages.

(56) References Cited

OTHER PUBLICATIONS

Rowland et al., "Designing Connected Products: UX for the Consumer Internet of Things", O'Reilly, May 31, 2015, 452 pages.
Wikipedia, "Home Automation", Available At: <https://en.wikipedia.org/w/index.php?title=Home_automation&oldid=686569068>, Oct. 19, 2015, 9 Pages.
Wikipedia, "Speech Recognition", available at <http://en.wikipedia.org/wiki/Speech_recognition>, retrieved on Sep. 14, 2011, 12 pages.
Young et al., "POMDP-Based Statistical Spoken Dialog Systems: A Review", Proceedings of the IEEE, vol. 101, No. 5, 2013, 18 pages.

* cited by examiner

INTEGRATED SENSOR FRAMEWORK FOR MULTI-DEVICE COMMUNICATION AND INTEROPERABILITY

CROSS-REFERENCE TO RELATED APPLICATIONS

This application claims priority to U.S. Provisional Patent Application No. 63/408,985, entitled "INTEGRATED SENSOR FRAMEWORK FOR MULTI-DEVICE COMMUNICATION AND INTEROPERABILITY," filed on Sep. 22, 2022, the contents of which is hereby incorporated by reference in its entirety.

FIELD

This application relates generally to multi-device communication and, more specifically, to an integrated sensor framework for multi-device interoperability.

BACKGROUND

Today's electronic devices are equipped with many useful sensors for collecting various information. Electronic devices are increasingly being used in the home environment, and may collect data from sensors such as cameras, microphones, and proximity sensors. This data contains a vast amount of information corresponding to the surrounding environment. However, existing systems do not effectively manage, sort, and compile this information for effective utilization by the end-user, while also preserving user privacy. Moreover, traditional systems are not effective at drawing inferences from this data, and recursively building this information back into the existing data set. For example, existing systems do not provide summaries regarding historical activity over time, nor do these systems proactively offer users notifications regarding unusual or unique activity within an environment. Conventional sensor systems also do not effectively facilitate analyzing and responding to speech requests from users within the environment. Accordingly, an improved system for an integrated sensor framework is desired.

SUMMARY

Systems and processes for an integrated sensor framework are provided. For example, a first electronic device receives at least one input including sensor data from a second device. A representation of a physical environment associated with the first electronic device is obtained based on sensor data from the first electronic device and the sensor data from the second device. Movement information corresponding to movement of an object within the physical environment is identified. Event information is determined corresponding to activity within the physical environment, wherein the event information is determined based on the identified movement information and the representation of the physical environment. Accordingly, an output is provided to the user based on the event information.

DETAILED DESCRIPTION

Figure 1:
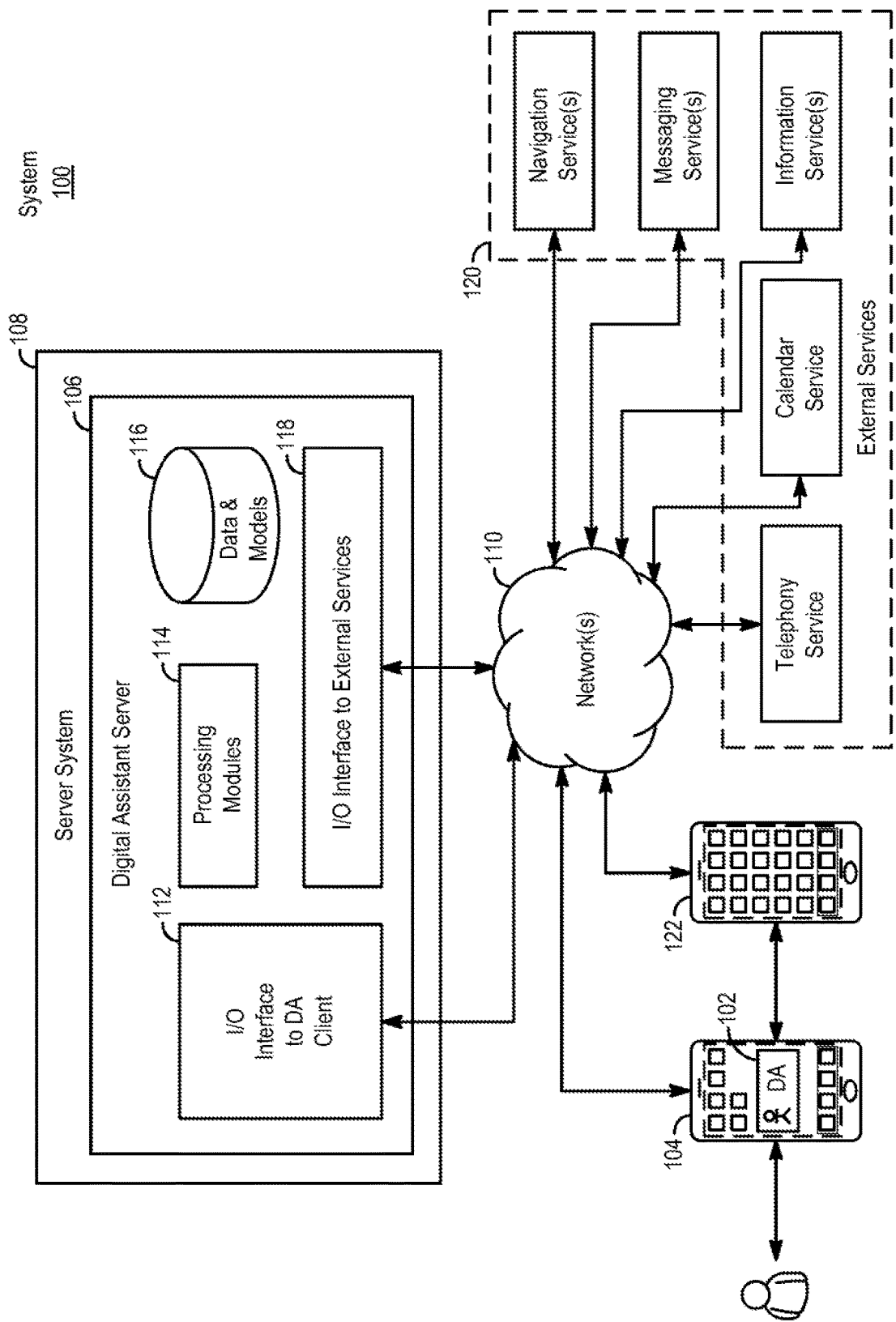
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

Traditional techniques for processing sensor data are generally outdated. In particular, conventional sensor systems do not integrate a wide variety of signals in order to build an environmental representation. Nor do such systems use the resultant environmental representation to assist a user with highly relevant tasks. For example, existing systems are not configured to convey an interactive environmental representation to a user, such as permitting the user to view historical information regarding a surrounding environment. These systems are also not equipped to fuse sensor data for assisting with spoken requests from a user. While some systems may include stand-alone devices with individual sensors, these systems do not effectively integrate sensor data from multiple devices into usable information that improves user-devices interactions within an environment. Accordingly, an improved system for an integrated sensor framework is desired.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing LUO interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-6B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary indifferent implementations. For instance, in some examples, the DA client is a thin-client that provides only user-facing input and output processing functions, and delegates all other functionalities of the digital assistant to a backend server.

2. Electronic Devices

Figure 2A:
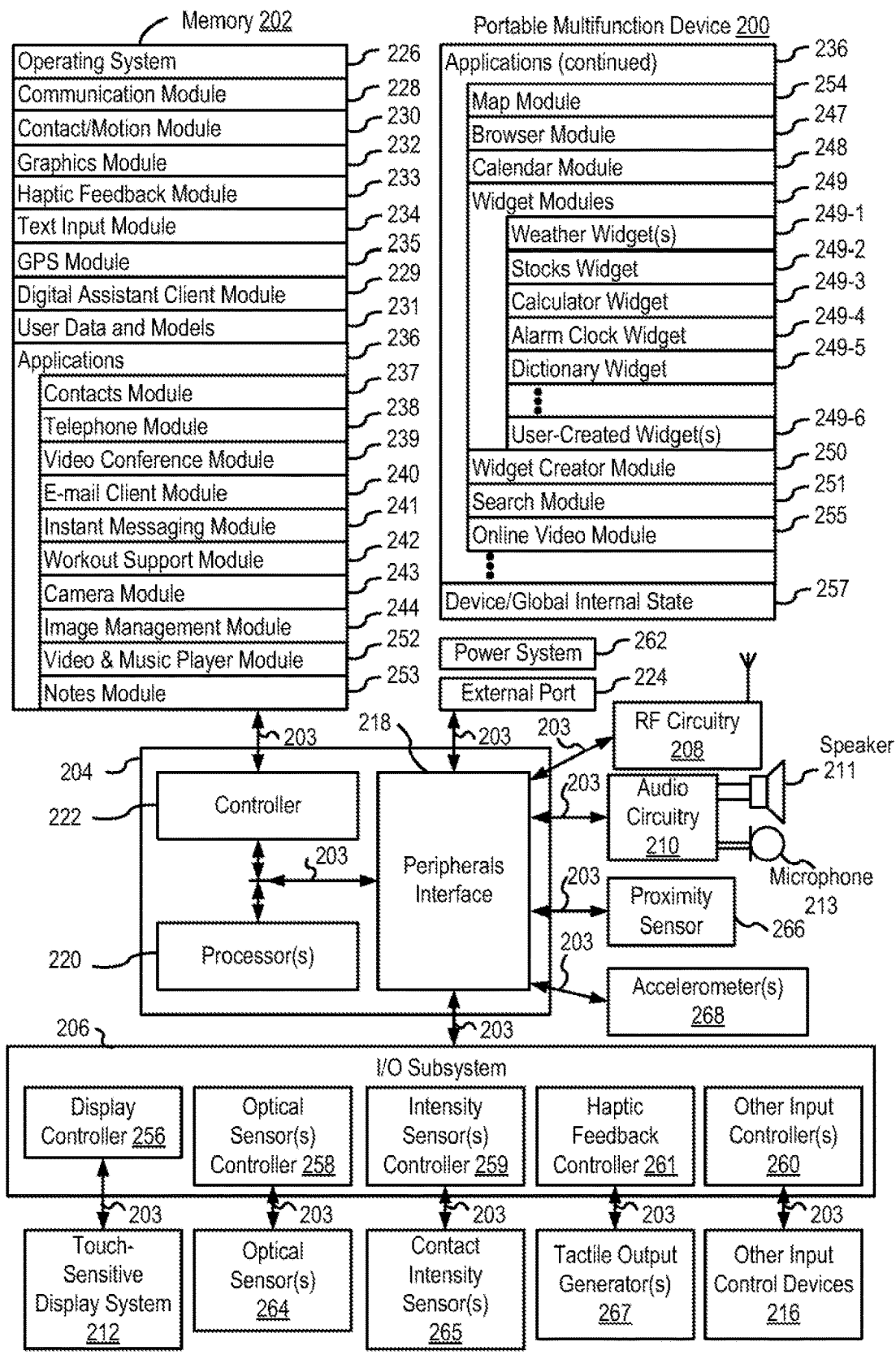
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
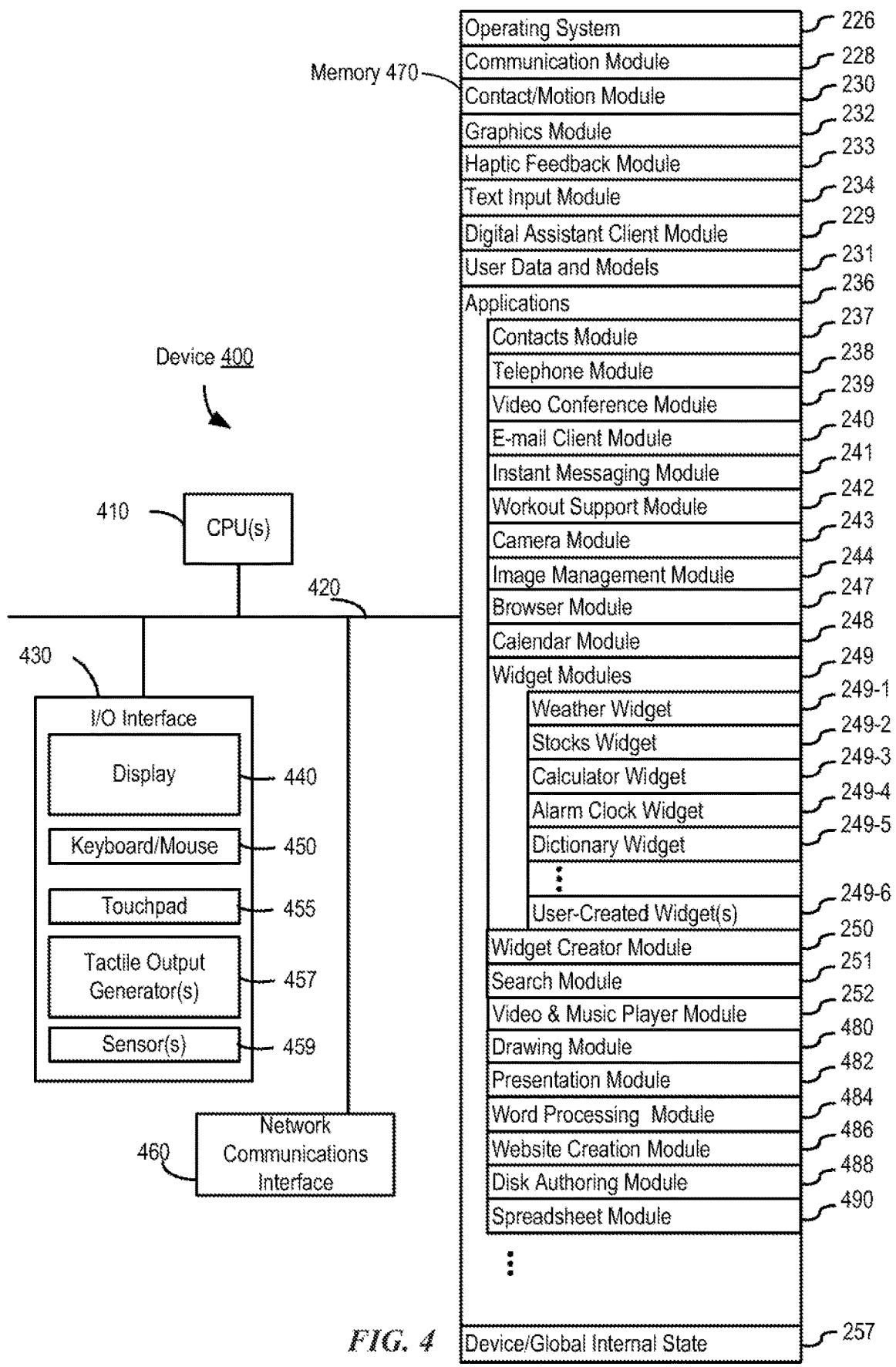
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts module 237, e-mail client module 240, IM module 241, browser module 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:
  Contacts module 237 (sometimes called an address book or contact list);
  Telephone module 238;
  Video conference module 239;
  E-mail client module 240;
  Instant messaging (IM) module 241;
  Workout support module 242;
  Camera module 243 for still and/or video images;
  Image management module 244;
  Video player module;
  Music player module;
  Browser module 247;
  Calendar module 248;
  Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
  Widget creator module 250 for making user-created widgets 249-6;
  Search module 251;
  Video and music player module 252, which merges video player module and music player module;
  Notes module 253;
  Map module 254; and/or
  Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 238, video conference module 239, e-mail client module 240, or IM module 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
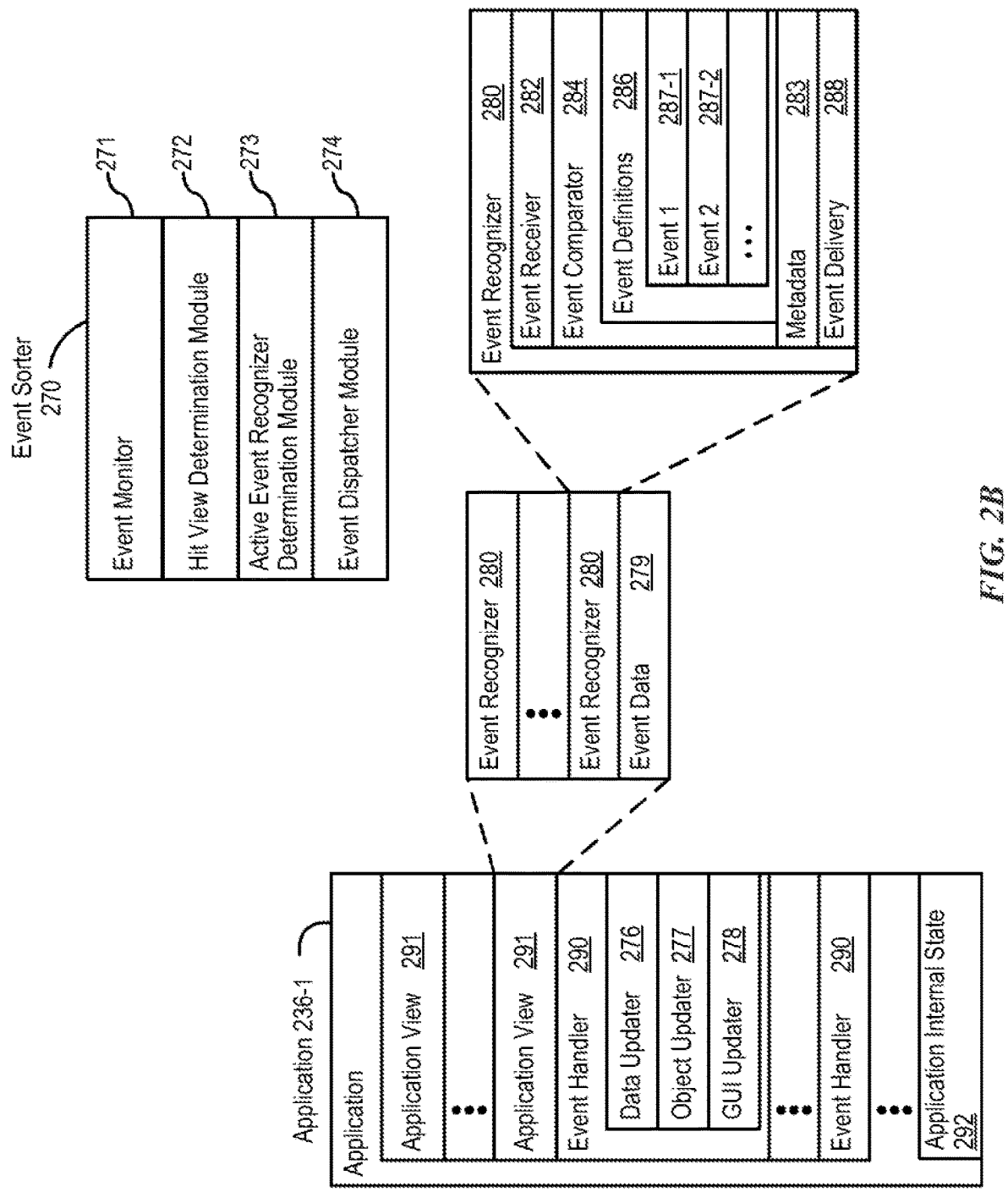
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of data updater 276, object updater 277. GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identities an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
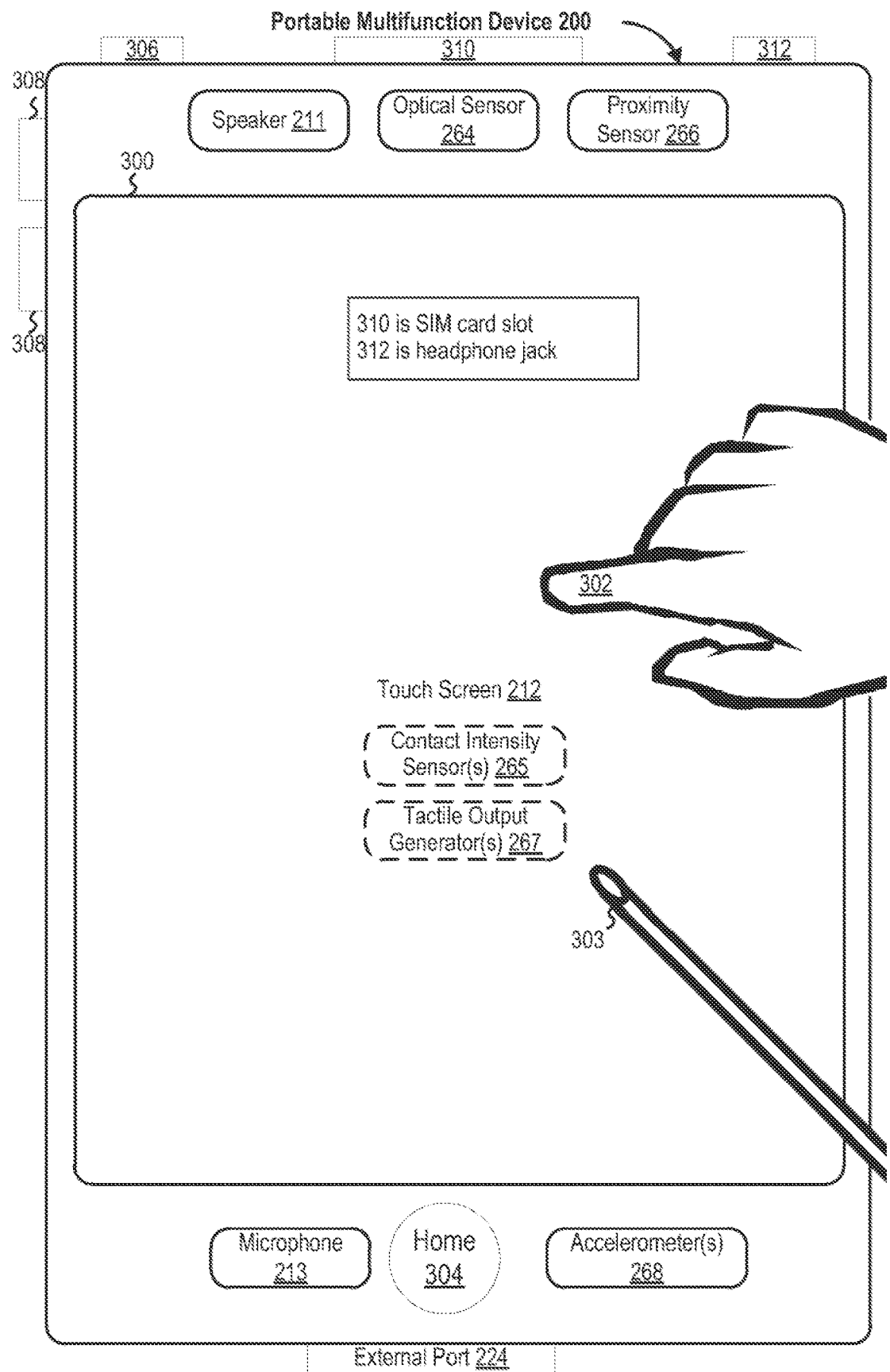
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
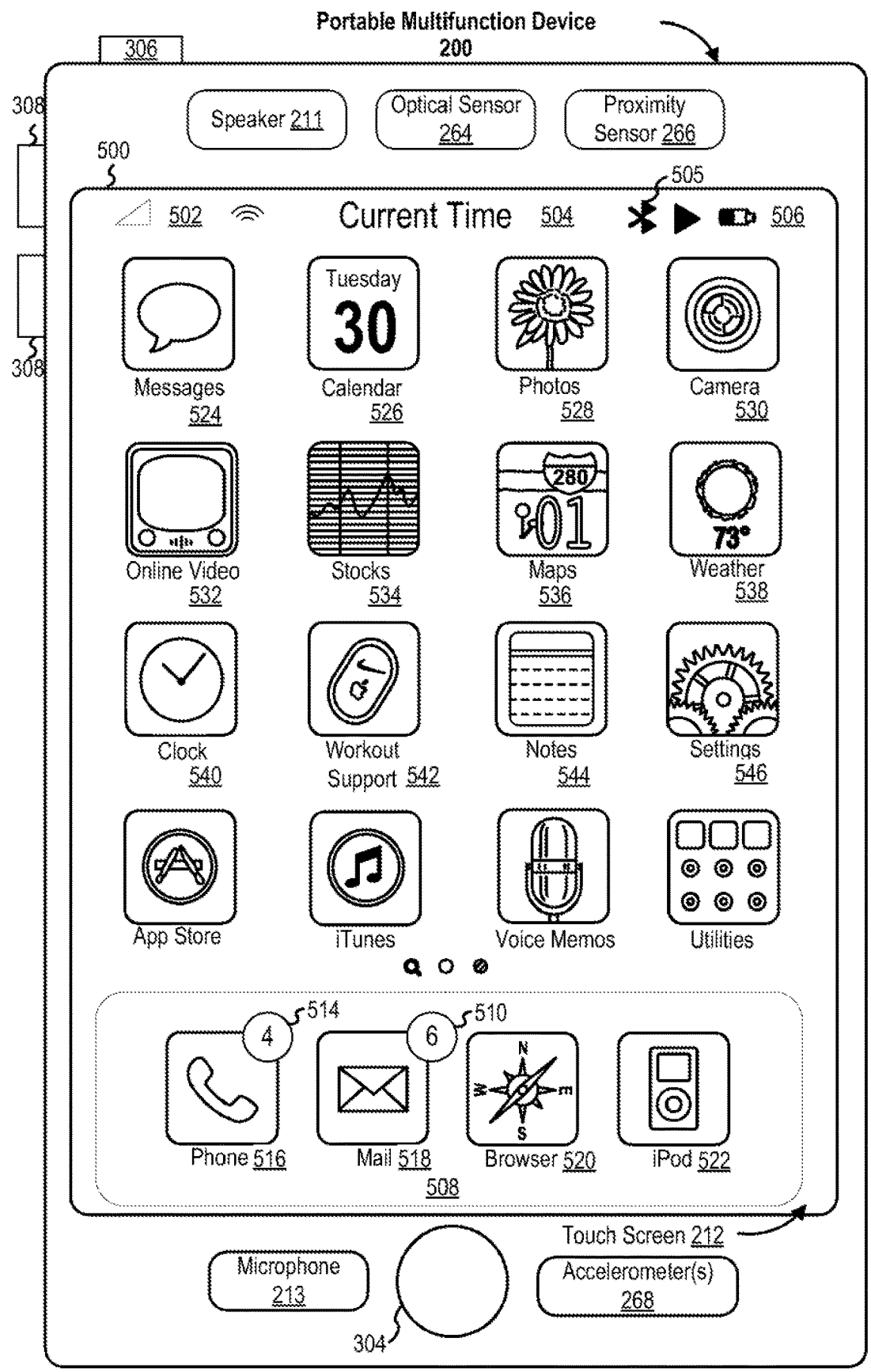
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;

Time 504;

Bluetooth indicator 505;

Battery status indicator 506;

Tray 508 with icons for frequently used applications, such as:

Icon 516 for telephone module 238, labeled "Phone," which optionally includes an indicator 514 of the number of missed calls or voicemail messages;

Icon 518 for e-mail client module 240, labeled "Mail," which optionally includes an indicator 510 of the number of unread e-mails;

Icon 520 for browser module 247, labeled "Browser;" and

Icon 522 for video and music player module 252, also referred to as iPod (trademark of Apple Inc.) module 252, labeled "iPod;" and Icons for other applications, such as:
Icon 524 for IM module 241, labeled "Messages;"
Icon 526 for calendar module 248, labeled "Calendar;"
Icon 528 for image management module 244, labeled "Photos;"
Icon 530 for camera module 243, labeled "Camera;"
Icon 532 for online video module 255, labeled "Online Video;"
Icon 534 for stocks widget 249-2, labeled "Stocks;"
Icon 536 for map module 254, labeled "Maps;"
Icon 538 for weather widget 249-1, labeled "Weather;"
Icon 540 for alarm clock widget 249-4, labeled "Clock;"
Icon 542 for workout support module 242, labeled "Workout Support;"
Icon 544 for notes module 253, labeled "Notes;" and
Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
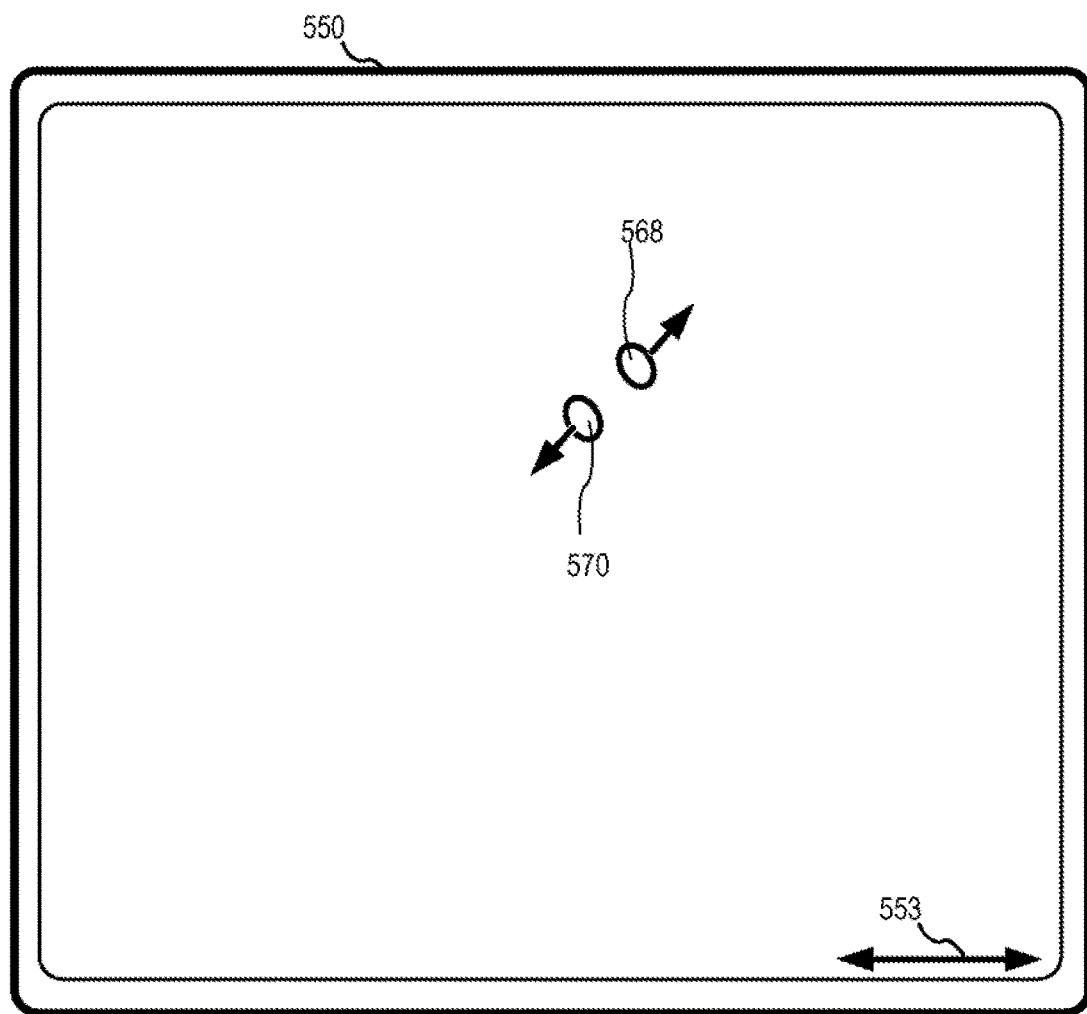
FIG. 5B illustrates an exemplary user interface for a multifunction device with a touch-sensitive surface that is separate from the display, according to various examples.
Figure 5B:
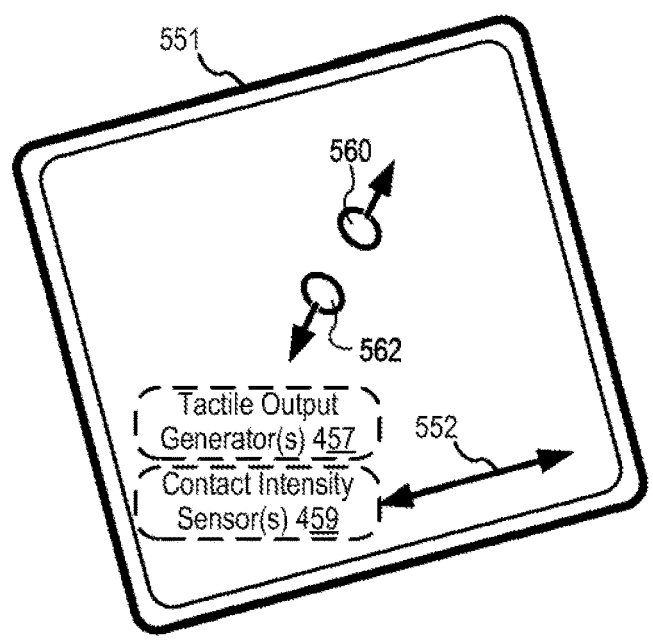

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 459) for detecting intensity of contacts on touch-sensitive surface 551 and/or one or more tactile output generators 457 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
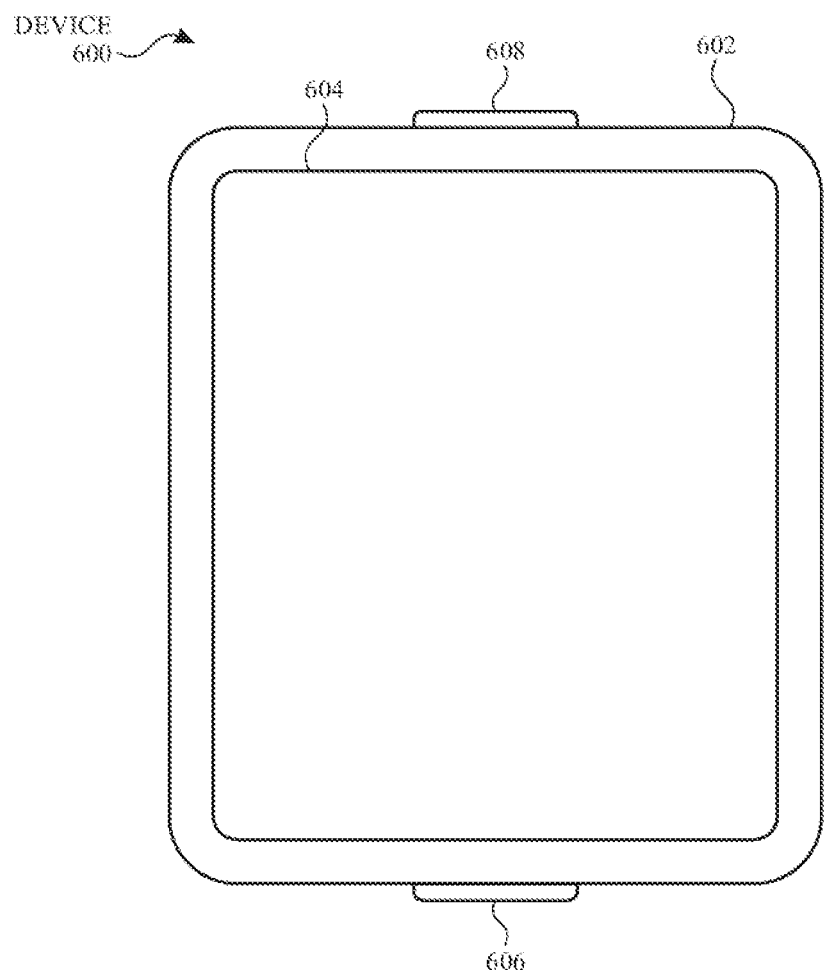
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
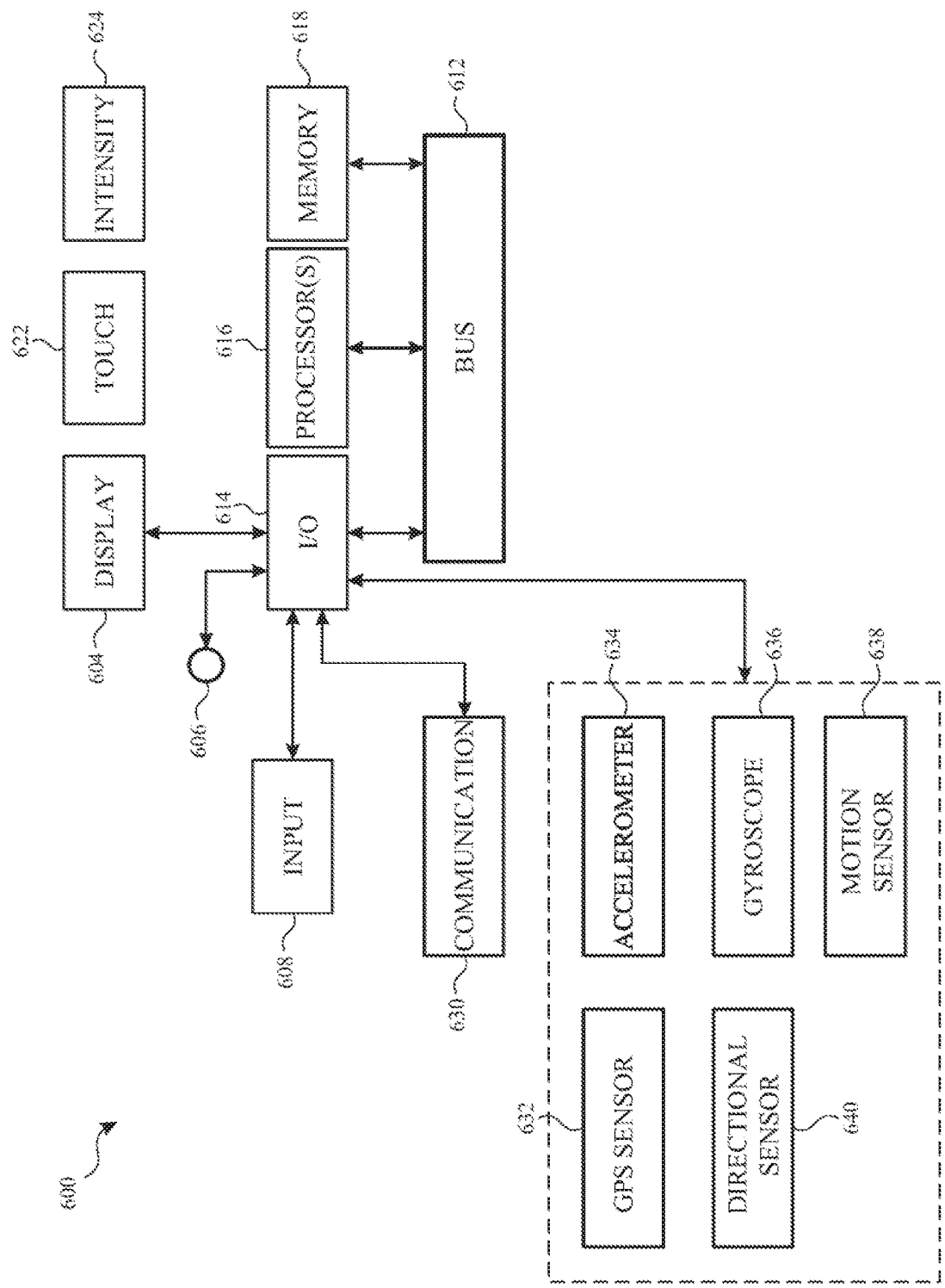
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and or 600 (FIGS. 2A, 4, and 6A-6B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
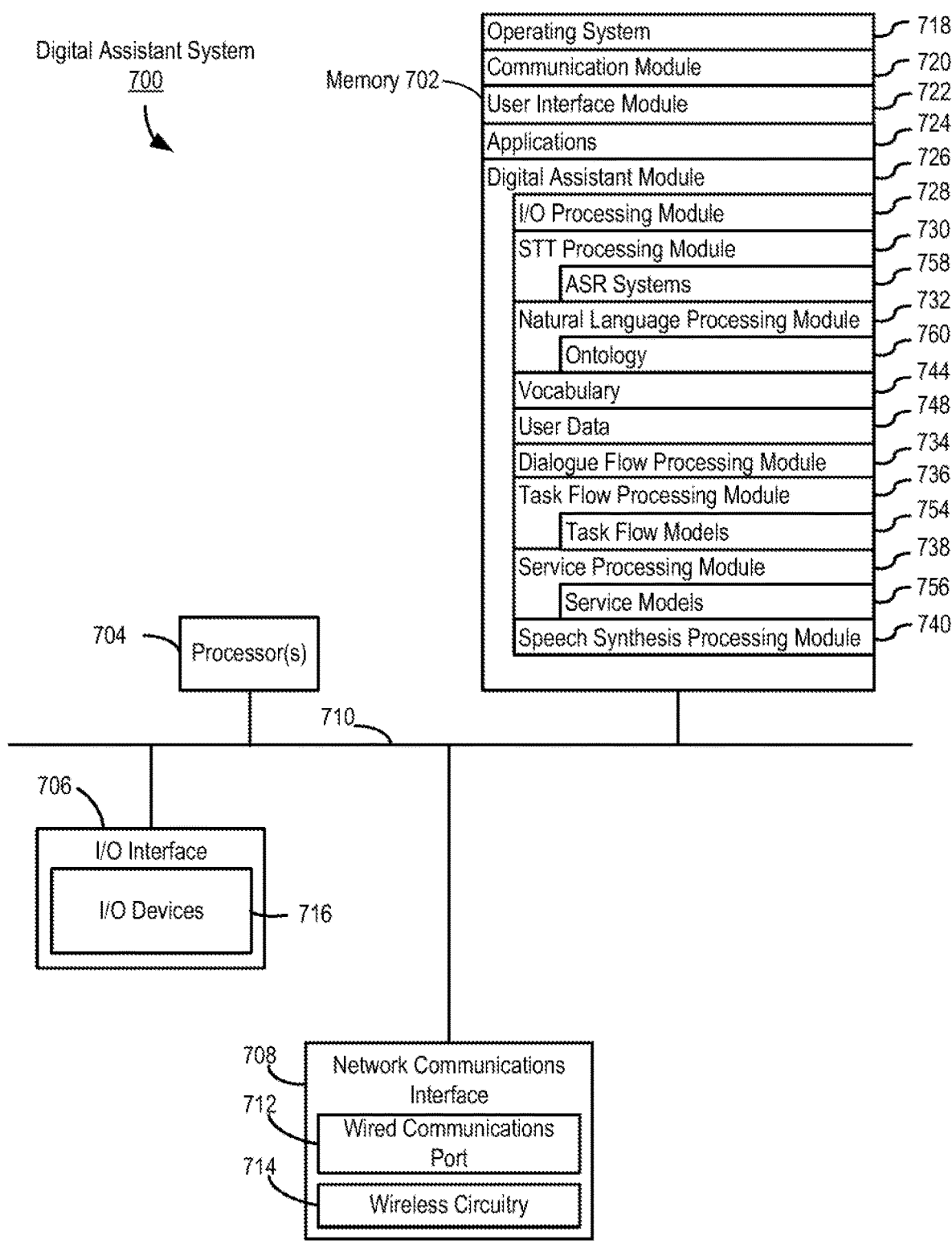
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-6B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user, actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
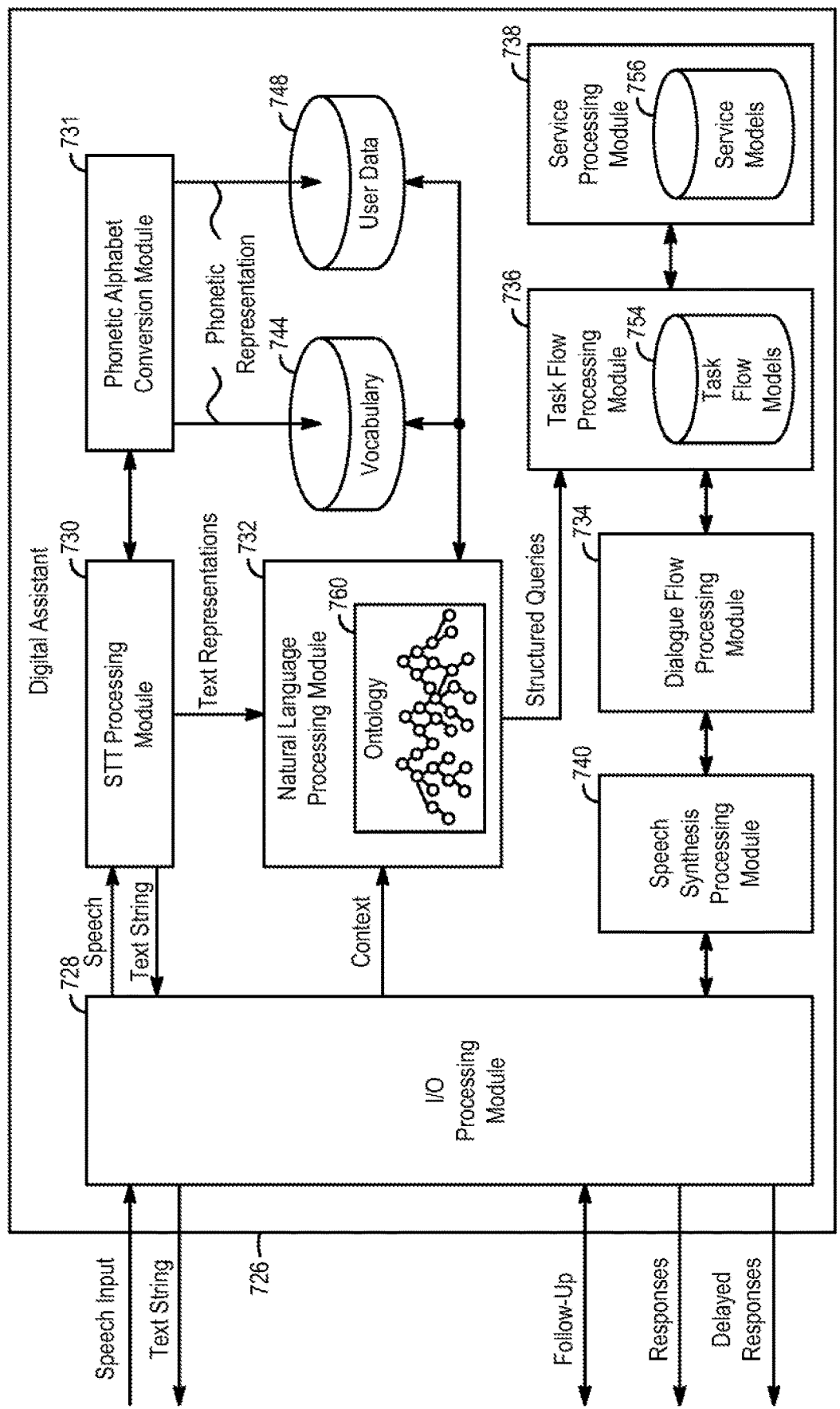
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of tə'meɪroʊ and tə'mɑtoʊ. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation tə'meɪroʊ is ranked higher than tə'mɑtoʊ, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation tə'meɪroʊ is associated with the United States, whereas the candidate pronunciation tə'mɑtoʊ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation tə'meɪroʊ (associated with the United States) is ranked higher than the candidate pronunciation tə'mɑtoʊ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes tə'meɪroʊ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes tə'meɪroʊ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
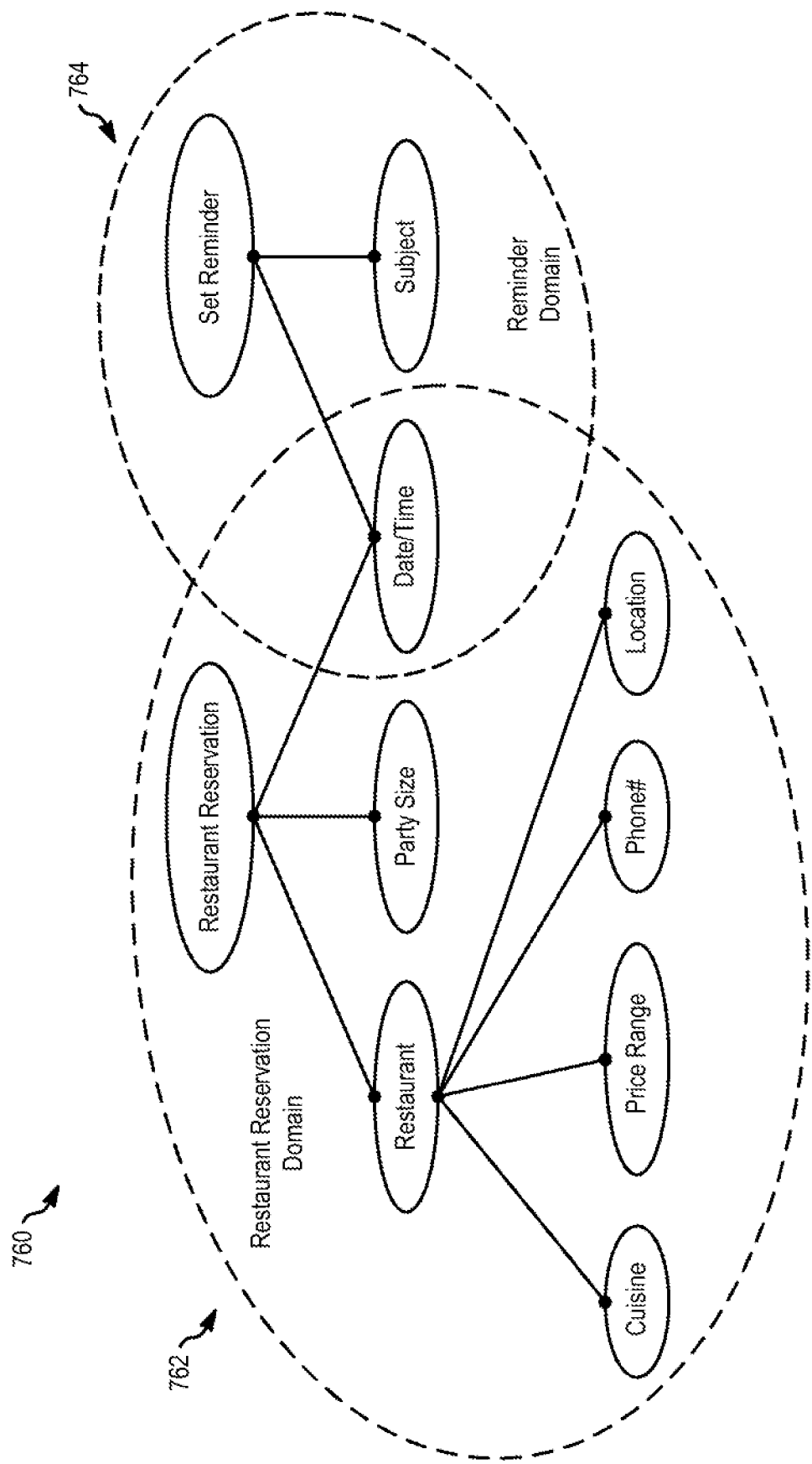
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm" }. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Integrated Sensor Framework for Multi-Device Communication and Interoperability FIGS. 8-12B illustrate systems and processes for an integrated sensor framework, according to various examples. For example, electronic device 802a may include any device described herein, including but not limited to devices 104, 200, 400, and 600 (FIGS. 1, 2A, 4, and 6A-6B). Thus, it will be appreciated that the electronic devices associated with FIGS. 8-12B may correspond to a user device of any type, such as a phone, laptop computer, tablet, wearable device (e.g., smart watch or head-mounted display), and the like. Furthermore, the processes described herein may be performed by a server with information delivered to and from the device, performed on the device, or a combination thereof.

Figure 8:
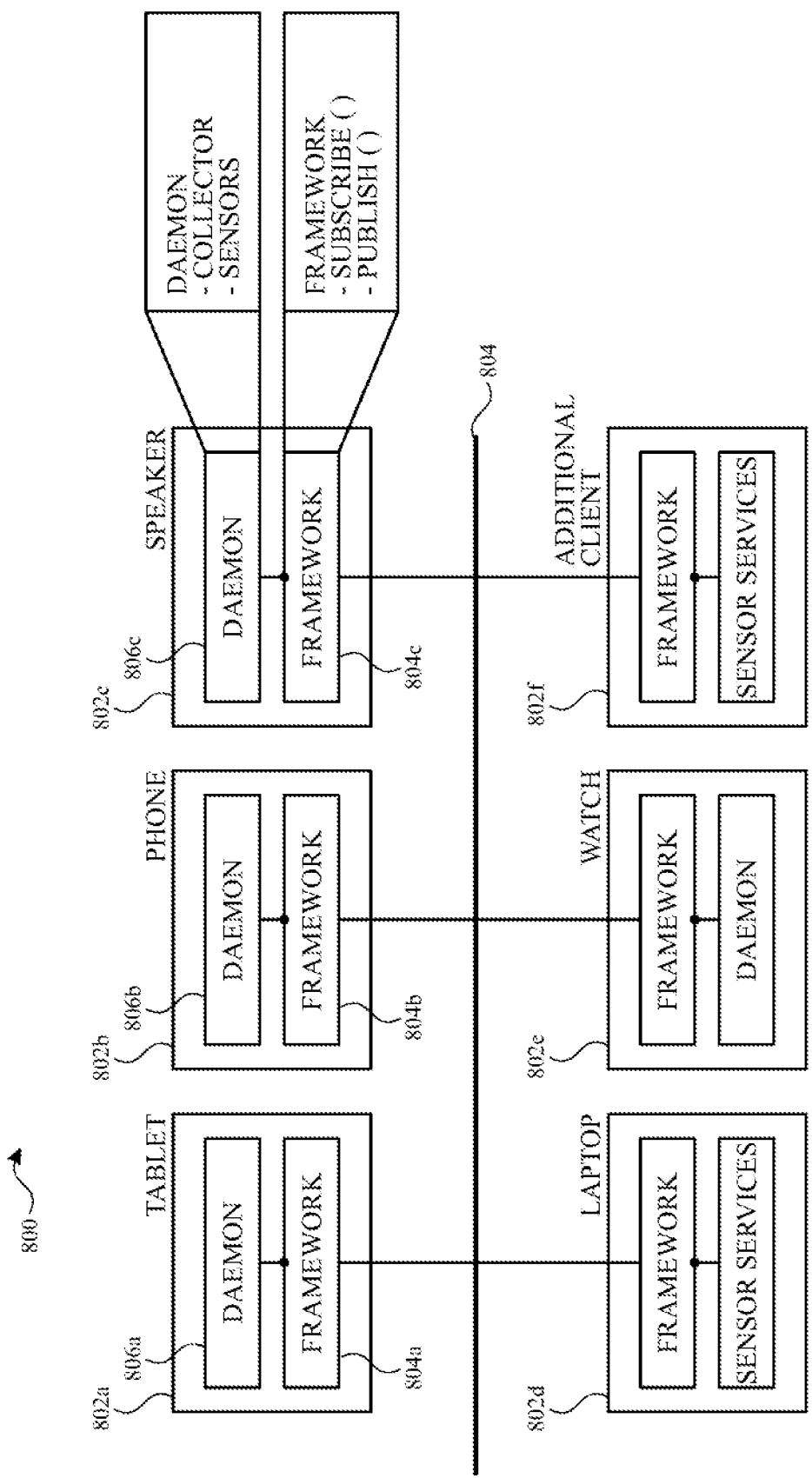
FIG. 8 illustrates an exemplary integrated sensor framework, according to various examples.

With reference to FIG. 8, an exemplary architecture 800 for the sensor framework is depicted. In general, architecture 800 includes representations 802 of various devices that may subscribe to local and/or remote sensor streams. For example, interface 804 enables tablet 802a to obtain sensor data from one or more other devices, such as smartphone 802b, speaker 802c, laptop 802d, smart watch 802e, and the like. Interface 804 may be established over one or more wired or wireless communication channels, such as via a local WiFi router, Bluetooth, Ultra-wideband (UWB), and the like. Each device may include a respective framework to enable interfacing with other devices to obtain sensor data. For instance, framework 804a enables tablet 802a to obtain sensor data from phone 802b via framework 804b. Each framework may utilize various commands or other functions to send and receive sensor data. For example, devices may subscribe to specific sensor streams, and/or publish sensor data to the sensor framework for other devices to consume. These commands and functions may include sensor data objects that are sent via interface 804. Sensor data objects also include types that may correspond to a respective sensor. For instance, tablet 802a may include a camera device that generates image sensor data objects typed as "image," "picture," "video," etc. A camera device may also be capable of detecting a user gaze, and thus may generate gaze-based data objects indicating whether various persons in the environment are looking at or in the general direction of the respective camera. Phone 802b may include a microphone that generates sound objects such as "sound," "speech," "silence," etc. Speaker 802c may include one or more proximity sensors which generate values indicating persons or other objects and corresponding proximity (e.g., distance) from the respective speaker. Laptop 802d may include wireless connection data objects indicating connection quality to various other devices. Smart watch 802e may include health data objects indicating various health metrics of the wearing user (e.g., heart rate, temperature, blood oxygen level, etc.). Various other devices may also send and receive sensor data via the framework interface, such as home-related devices (e.g., thermostats, refrigerators, lights, door locks, etc.). In some cases, such devices may include APIs to communicate with interface 804 in order to send, receive, and process corresponding sensor data objects, send and receive commands, and the like.

Various devices may also include a daemon process to handle subscriptions to the sensor framework, publish sensor values to the sensor framework, and facilitate other sensor-related tasks using sensors, data collectors, and other appropriate software modules and hardware. In general, the daemon facilitates subscriptions to various sensor objects as defined by default, group policy, a particular user or system administrator, and the like. Various examples are presented herein, which are not exhaustive but rather are for demonstrative purposes. Tablet 802a includes daemon 806a that may request subscriptions to any sensor data, generated by other devices coupled to interface 804, that includes, for example, image, video, or other camera-type sensor objects. In some examples, a client on-device requests a subscription to specific sensor data, and the subscription request is then passed to the daemon which facilitates the subscription process. Similarly, phone 802b includes a daemon 806b that may request subscriptions to any sensor data from a particular device, such as speaker 802e. Watch 802e includes a daemon 806c that, for example, submits a subscription request to not receive any sensor data from particular devices (e.g., home security cameras) and/or sensor data of a specific type (e.g., presence notifications of persons within the home). In some cases, other processes or software modules may handle subscriptions in addition to or place of the daemon process. When no other processes handle the subscriptions, the daemon process may act as a default for handling the data object subscriptions. In addition, the daemon process may publish sensor data from the particular device to interface 804, such as sensor data from cameras, microphones, proximity sensors, wireless connections, and other sensor data relating to device states, positions, orientations, and other relevant context information.

One or more devices within architecture 800 may also include sensor services, such as laptop 802d. In particular, sensor services may correspond to any client process that obtains sensor data from interface 804, processes the sensor data, and provides the processed results back to interface 804 to be read by other devices. In this way, information received via interface 804 is recursively managed, such that additional inferences and calculations are made for environmental conditions based on the initially or subsequently detected sensor data. As an example, sensor data received from various devices may indicate relative positions of devices and corresponding objects in an environment, such as device locations including a set-top box and corresponding television display, a home speaker, a laptop, a smartphone, and a smart watch being worn by a respective user. In addition, image or video information may indicate (e.g., based on image recognition) that various objects and persons are present in the environment. Using the sensor data, one or more sensor services (e.g., sensor services on a home speaker, a smartphone, a laptop, etc.) may build a multi-dimensional representation of the device environment based on the initial sensor data. Once the initial representation of the device environment is obtained, the representation is sent back to interface 804 and made available for other devices to utilize in processing various commands, requests, or other system level tasks. In particular, the representation may be used to approximate or otherwise estimate the location of specific objects within the environment, even when such objects are not equipped with any location monitoring device (e.g., furniture, appliances, persons, pets, etc.).

As an example, recognition of a specific person in the device environment may be facilitated, for example, using facial recognition on a home security camera. Accordingly, the identity information may be integrated into the environmental representation and passed back to interface 804 for access by various devices utilizing the framework. As described herein, users within the environment may opt-in or opt-out of the tracking mechanisms in order to preserve user privacy. For users who have opted-in, once the identity information is integrated into the environmental representation, the location of the specific person may then be tracked throughout the environment, to the extent sensor data is available to provide continuity in tracking the individual. For instance, the individual may leave the viewing angle of the respective home security camera, although additional sensor data may indicate that the individual is still within a particular room or area of the environment, such as a proximity sensor on home speaker, an additional camera on a tablet computer, a motion sensor on a home appliance (e.g., thermostat, refrigerator, etc.). The individual's location may thus be continually tracked throughout the environment based on sensor data reflecting motion, sound waves, wireless or wired device interactions, and the like.

In some cases, only limited sensor data may be available to facilitate location tracking of an individual. For instance, an environment may only be equipped with several devices such as a speaker, a smart thermostat, and a pair of wireless headphones wirelessly coupled to a smartphone. In order to facilitating the tracking of the user, each device may publish sensor data with a corresponding confidence or other weight in order to assist with the location tracking. As the user moves into the environment, the user's footsteps may be detected from the microphone on the speaker, such that the acoustic information reflecting the footsteps (and corresponding position) is published to the sensor framework with a moderately high confidence (e.g., 75%). As the user passes in front of the smart thermostat, brief sensor data may be published with high confidence (e.g., 95%) indicating the user is walking past the thermostat. The user may then affix the wireless headphones to the user's ears and begin listening to music, for example, via a smartphone resting on a surface. To the extent the wireless headphones include a location tracking device, the sensor data from the wireless headphones may be published as sensor data. Specifically, the sensor data from the wireless headphones may indicate movement of the user through the environment, with high confidence, as the user listens to music. Accordingly, the each set of sensor data from the speaker, thermostat, and wireless headphone may be merged in order to approximate user movements through the environment, relative to respective confidences from each sensor.

In general, architecture 800 may also facilitate pattern recognition in order to build additional information into the environmental representation. Using the sensor data, for example, sensor services may analyze historical data to identify data regularities and other trends related to objects within the environment. For instance, sensor data may indicate that individuals typically move (e.g., walk) throughout the environment in specific pathways. Similarly, the sensor data may reflect that other areas in the environment are never traversed by individuals, which may be indicative of walls, boundaries, or other non-navigable areas of the environment (e.g., tables, columns, etc.). In addition to other sensor data, such as image information indicative of walls, doors, hallways, furniture, and the like, sensor services may provide information to interface 804 including approximations within the environmental representation. Such approximations may reflect areas of the environment that are determined (e.g., with a sufficient degree of confidence) to be a specific type of area. For example, a hallway may be estimated based on frequent movement of individuals in a straight line within the area. A wall may be approximated given based on the absence of any movement within the area, in addition to image recognition consistent with a flat or otherwise solid surface indicative of a barrier. Various furniture, such as chairs, tables, couches, etc., may be approximated based on specific user activity proximate to the furniture. For example, the location of a chair may be approximated based on recognition of individuals frequently sitting at the location, combined with image recognition indicating an object resembling a chair is present at the location.

Certain devices within architecture 800 may act as an overall framework controller device and/or arbitrator for rendering various decisions, processing subscription requests, routing specific sensor data flows, and the like. Specifically, the controller device may be selected based on a variety of criteria, such as processing power, battery life, network latency, etc. Smartphone 802b may be selected as the controller device based on superior processing capabilities among the available devices within architecture 800. Alternatively, home speaker 802c may be selected as the controller device based on connection to a dedicated power supply, as opposed to a portable battery. Once the controller device is chosen, higher order decisions can be run at the controller device and respective information sent to interface 804 to manage the sensor data flows and corresponding environmental representation. As an example, various sensor data from one or more devices, such as a home security camera and/or laptop camera, may indicate presence of an unknown individual within the environment. Image recognition processes from one or more device cameras may indicate that the face of a user is detected without a corresponding facial recognition match (e.g., the facial recognition process does not recognize the user). Sensor data from additional devices, such as a smartphone of an unknown user, may also indicate a location of the device in very close proximity to the unknown individual. The controller device may then analyze whether the unknown identity can be resolved. For instance, the smartphone may indicate that facial recognition was recently performed on the smartphone, and/or authentication information (e.g., a passcode) was recently entered on the smart watch. Using the identity authentication information from the smartphone and smart watch, the controller device may render a decision, with sufficient confidence, that the identity of the unknown individual corresponds to the user of the smartphone and smart watch. Accordingly, controller device may update the environmental representation such that the devices within architecture 800 will now identify the previously unknown individual as the user of the smartphone and smart watch, subject to the user granting access to this information. Alternatively, the system may determine that the user is unknown, and, optionally, provide proactive alerts to the users associated with the environment, as described herein.

Selection of a new controller device may occur under various circumstances, such as a primary controller device becoming unavailable or otherwise becoming unable to facilitate proper control of the sensor framework and environmental representation. For instance, a smartphone 802b may be acting as the controller device, although the battery level of smartphone 802b may fall below a threshold level (e.g., 5%, 10%, etc.). As another example, a user of smartphone 802b may carry smartphone 802b outside the communicative range of architecture 800 (e.g., the user leaves the home and thus disconnects from the home WiFi network), such that smartphone 802b is no longer able to effectively communicate with architecture 800 and therefore is no longer able to act as the controller device. Upon the primary controller device becoming unavailable, a new primary controller device is chosen. In particular, one or more backup controller devices may be designated or otherwise selected, such as home speaker 802c or laptop 802d (e.g., based at least in part on processing power, power source, etc.). Once the smartphone becomes unavailable to act as the controller device, home speaker 802c, laptop 802d, or any other designated backup controller device may then be designated as the primary controller device.

Figure 9A:
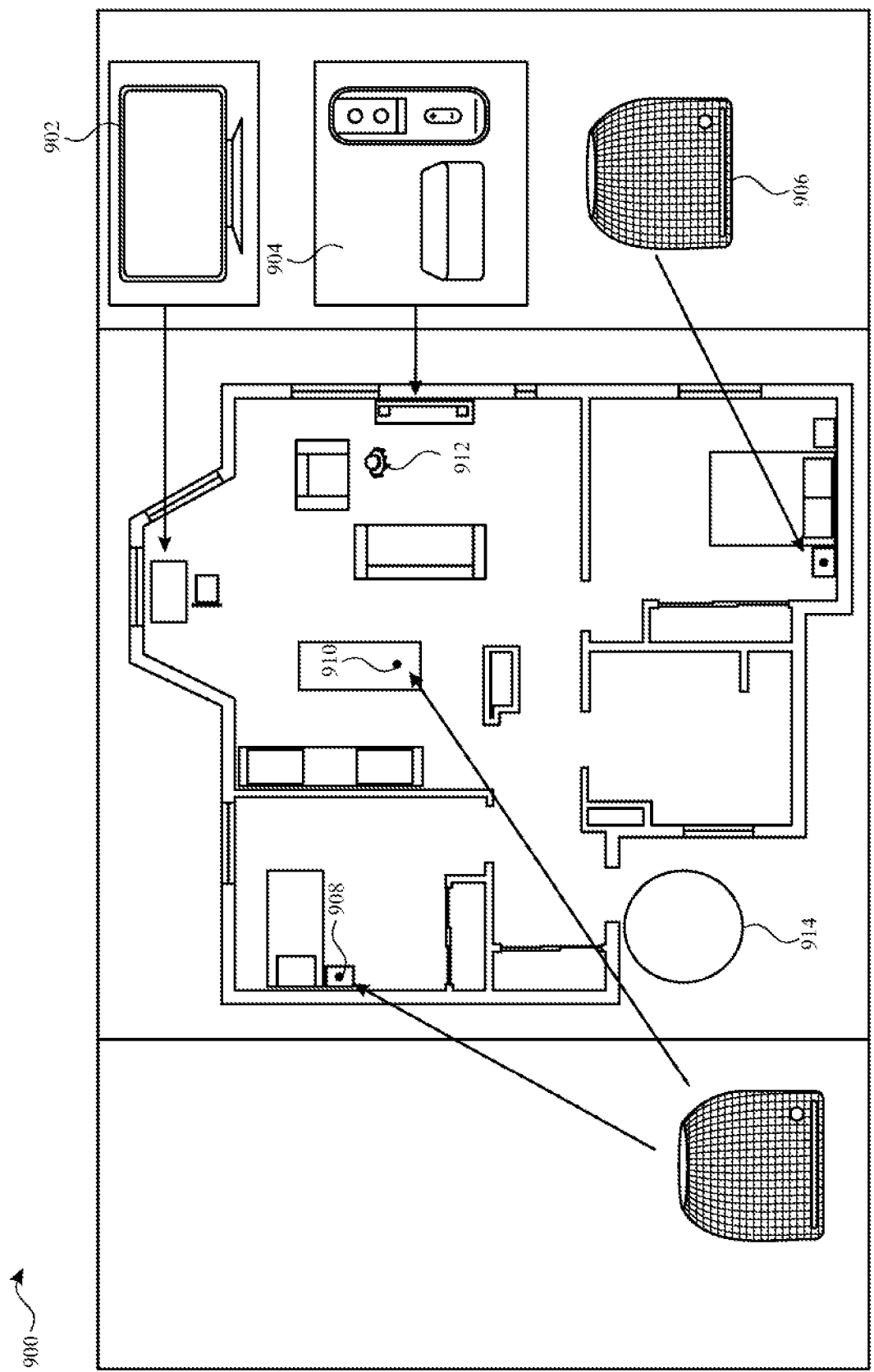
FIGS. 9A-9B illustrate an exemplary environmental representation, according to various examples.

With reference to FIG. 9A, an exemplary representation of a physical environment 900 is depicted. In general, the representation may be built based on sensor data using the architecture described with respect to FIG. 8. The environment 900 may include various devices, such as a computer device 902, a set-top-box device 904 (coupled to a display and remote), home speaker devices 906, 908, and 910, a smartphone device 912 being carried by a user, and a smart watch device (not depicted) being worn by the user. In some examples, one or more devices may act as the primary controller device, such as smartphone device 912 being carried by the user. Device 912 may continuously receive inputs including sensor data from various devices utilizing the sensor framework, such as sensor data from devices 902-910. Based on the sensor data from both device 912 and the devices in the environment, the representation of the environment is generated. As described herein, the representation may be a multi-dimensional representation (e.g., two-dimensional and/or three-dimensional) generated from sensor data, inferences, and approximations recursively built from the sensor data, and any additional information available to the sensor framework, such as manually entered information or information received from third parties. Initially, the representation may include coordinate values for each device in the environment, such as (x,y) or (x,y,z) values. Once additional sensor data is gathered and analyzed, additional information is built into the representation, such as approximate wall boundaries (e.g., based on movement patterns, acoustic analysis, etc.), doors, furniture and appliance objects (e.g., based on image recognition), and the like.

As an example, computer device 902 may be equipped with a camera device that periodically captures image information of the corresponding environment, including movements of the user and other individuals within the environment. The image information may be sent as sensor data via the sensor framework. Similarly, home speakers 906, 908, and 910 may each detect wireless connections to various devices in the environment (e.g., smartphone 912, devices owned by other individuals, etc.) and include the device information as sensor data. Wireless connection data may include device identifiers and provide approximate device location information (e.g., based on WiFi, Bluetooth, and/or UWB connections) as sensor data. Home speakers may also detect audio from various sources in the environment, such as humans, animals, home appliances, and other devices. The audio sources may be identified based on acoustic analysis (e.g., identification of human speech, animal sounds, doorbells, etc.) and be included as sensor data. Other acoustic information may also be provided as sensor data, such as the approximate direction and distance of the detected audio relative to the listening device. In some cases, gaze information may be provided as sensor data. For example, if a particular individual is looking towards a camera within the environment (e.g., camera on computer 902), the device associated with the camera may transmit sensor data including information reflecting that the user is looking in the direction of the camera.

As various devices, individuals, or other objects move about environment 900, movement information is captured, analyzed, and further incorporated as sensor data within the sensor framework. For example, the position of smartphone 912 may be tracked as smartphone 912 (as carried by the respective user) moves about the environment. The current coordinates of the smartphone, as well as the historical movement information (e.g., multiple coordinate points), may be captured by the sensor framework. Specifically, wireless connection information from set-top-box 914 may initially indicate that smartphone 912 is a specific distance from set-top-box 914. For example, wireless connection information may indicate that smartphone 912 is approximately 2 meters west of set-top-box 914, 2 meters to the left of set-top-box 914, and/or within a 2 meter radius of set-top-box 914, etc. In addition, the camera of computer 902 may provide sensor data indicating an individual is located at approximately the same position as smartphone 912, which provides an inference to the framework that the identified individual is also carrying the smartphone 912. Furthermore, wireless connection information from home speaker 910 may similarly indicate that smartphone is approximately 5 meters east of home speaker 910. Acoustic information may also be detected by home speaker 910, for example, which is detected as originating approximately 5 meters east of home speaker 910 (e.g., smartphone 912 is currently playing music, the user is talking on the phone, etc.).

Additional details on capturing and utilizing device movement information can be found in U.S. Utility application Ser. No. 15/272,391 (now granted as U.S. Pat. No. 10,200, 810), entitled "Proactive Actions on Mobile Device Using Uniquely-Identifiable and Unlabeled Locations," filed Sep. 21, 2016, and in U.S. Utility application Ser. No. 18/127, 594, entitled "Learning Emergent Indoor Locations of Interest with Minimal Infrastructure," filed Mar. 28, 2023, the entire disclosures of each of which are incorporated herein by reference.

Figure 9B:
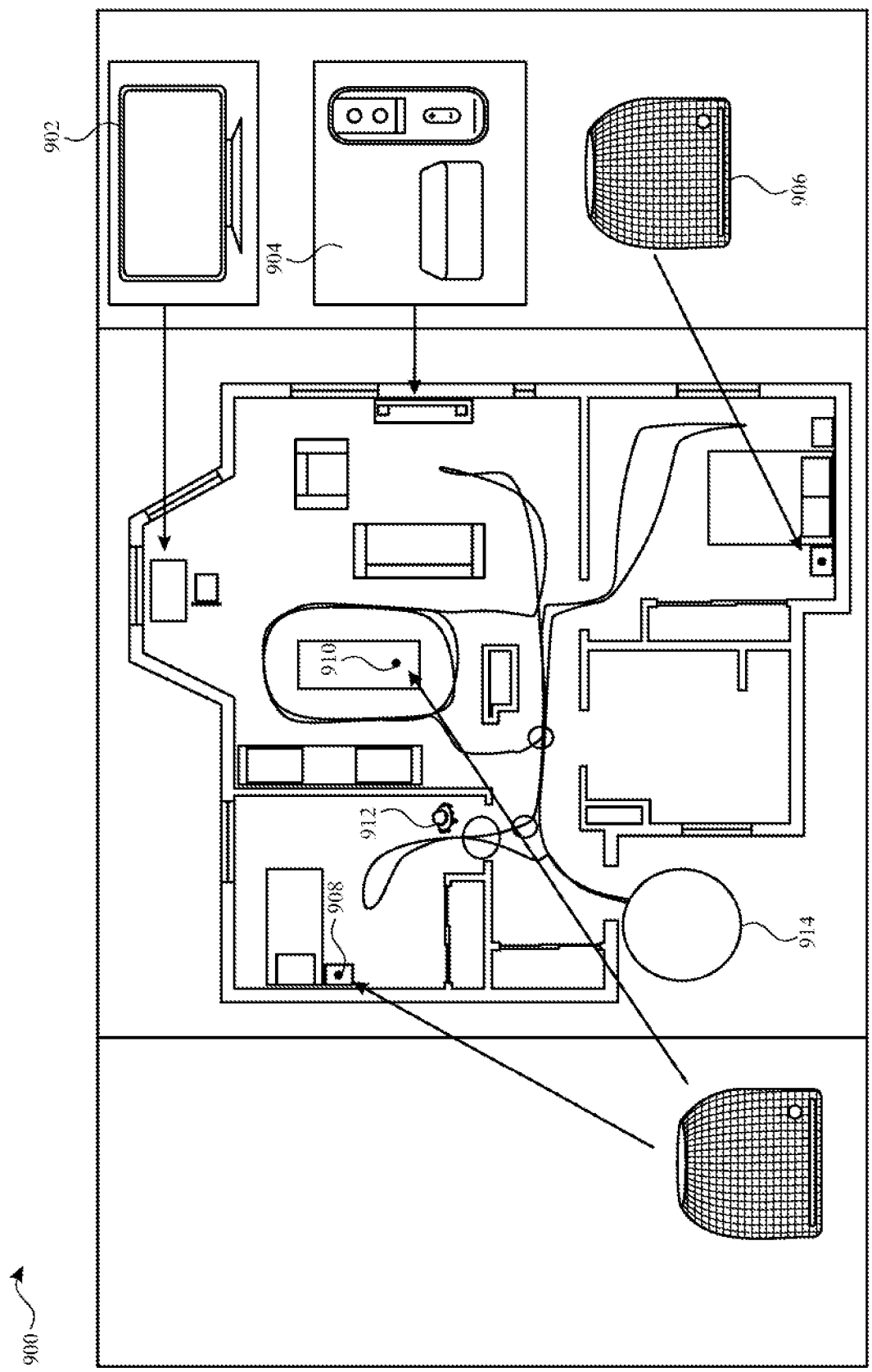
Figure 10:
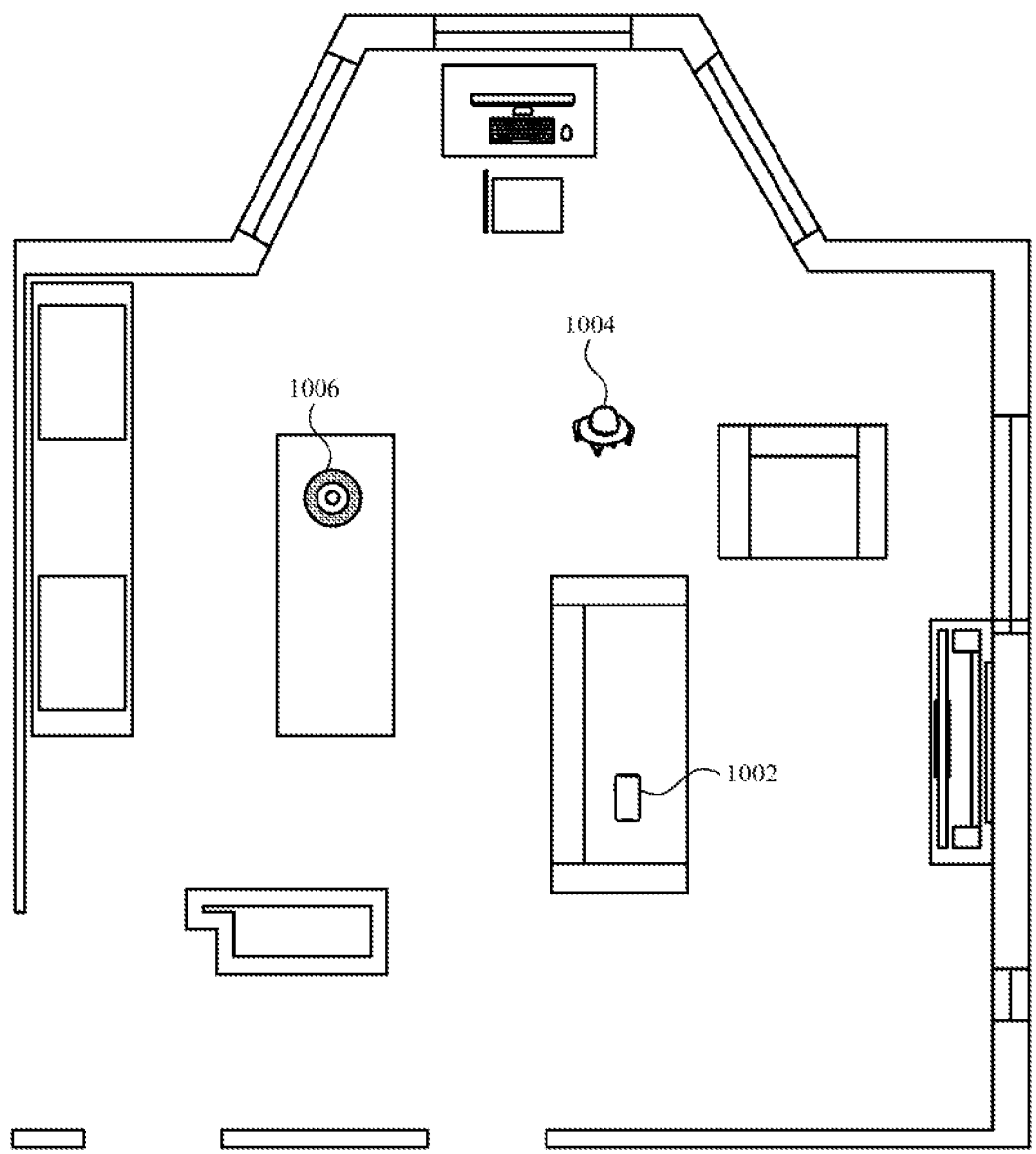
FIG. 10 illustrates an exemplary environmental representation, according to various examples.

With reference to FIG. 9B, smartphone 912 may move about environment 900, and accordingly, historical movement information of smartphone 912 may be captured and incorporated into the sensor data. For example, smartphone 912 may eventually move to the front bedroom including home speaker 906. As smartphone 912 moves into the front bedroom, various signals that were previously being used to track smartphone 912 may be lost or degraded, such as wireless signals from set-top-box 904 and home speaker 910. As smartphone 912 comes into wireless communication range with home speaker 906, position information associated with smartphone 912 continues to be recorded as sensor data. Home speaker 906 may also detect acoustic information from smartphone 912 (e.g., the user may continue to listen to music on smartphone 912, continue talking on smartphone 912, etc.). In some cases, smartphone 912 may briefly move into an area in which none of the devices in the environment are capable of obtaining sensor data associated with smartphone 912 or the corresponding user, such as area 914 (e.g., an area outside of the home). Given a short period of non-detectability (e.g., 10 seconds), an inference may be provide, as sensor data, an approximate general area that smartphone 912 may be located (e.g., a circular area of several square meters). Smartphone 912 may then re-enter the environment, such as by moving into the rear bedroom and establishing a wireless connection with home speaker 908, for example.

The movement depicted in FIG. 9B may also be tracked based on a user that is not carrying any device. In general, such movements may be tracked based on image recognition, radar, sonar, and various proximity sensors. For instance, the user may move to the front bedroom including home speaker 906, such that the camera from computer 902 captures images of the user walking into the room. Other sensors may detects proximity information as the user enters the room, such as a smart thermostat or smart appliance (not depicted). Home speaker 906 may also detect acoustic information from the user walking, or the user producing other sounds such as speech. The acoustic information may then be used to approximate the user's location through the environment. As the user moves back through the living room area and into the rear bedroom, various acoustic may also be captured by speakers 908 and 910 to estimate the user's movement, along with image recognition data from computer 902. Various other devices may also estimate the user's position in the environment using proximity information, such as smart watches, smartphones or tablets sitting on surfaces, and the like. Each of the sensor data is published to the sensor framework as the user navigates the environment to provide an approximation of the user's real-time movements through the environment.

In some cases, information is identified which may be of particular interest to a user. Such information may correspond to movement information of a person, device, or object, or other information such as audible information (e.g., glass shattering), wireless connection information (e.g., an unknown device connecting to a WiFi network), device state information (e.g., low battery, software upgrades), health information, new messages, breaking news, and the like. For example, home speaker 910 may capture the sound of a door opening, and computer 902 may capture an image of an individual entering through the front door. Sensor data for both the sound and the captured image are sent to interface 804 and incorporated into the representation of the environment. In general, activity within the environment that is not readily attributable to the primary occupant(s) of an environment may cause event information to be generated. For example, sensor framework may detect that the primary occupant is either away from home (e.g., at a work location), or in a specific area of the home (e.g., the front bedroom). Accordingly, sensor framework may draw an inference that the individual entering through the front door is not the primary occupant(s) of the environment. Accordingly, an output may be provided to the primary occupant (via smartphone 912, for example) indicative of the event information. The primary occupant may receive a textual and/or audible alert at smartphone 912 indicating "Someone is entering through the front door." The alert may also include one or more options to connect to one or more sensors in the home, and in particular, sensors relevant to the event information such as a microphone and speaker on home speaker 910, the camera on laptop 902, and the like.

Over time, certain patterns are recorded, recognized, and used to build the environmental representation. In general, as individuals move about environment 900 (as detected with or without devices), the individuals may frequently traverse certain areas as shown in FIG. 9B. Similarly, the individuals may rarely traverse certain areas, such as near walls or corners. Moreover, various areas may never be traversed. Combined with other sensor data, such as image and lighting information, acoustic information, and wireless signal information, inferences may be drawn as to the existence of additional objects and boundaries within the environment. Specifically, for areas that are never traversed, and also include an appearance consistent with a wall, the representation may be updated to include the approximation of a wall within the respective area. Similarly, acoustic information (e.g., echoes from a home speaker) may indicate that sound is generally reflected from the given area (e.g., a wall), or reflected with certain characteristics from a certain area (e.g., a couch, a table etc.). Wireless signals may also generally not pass through the respective area (e.g., wireless signals become degraded or lost when devices move past a certain coordinate position). The environmental representation may thus be updated to approximate each object, wall, floor, and ceiling boundary to the extent possible based on the available sensor data.

Information related to additional objects within the environment may also be determined, such as furniture, appliances, plants, doors, windows, etc. As an example, devices such as smartphones may be frequently placed at respective areas throughout the environment, such as a counter near home speaker 910. Based on coordinate information such as height, an inference may be drawn that a table or counter exists at the respective location. Sensor data may also indicate that individuals frequently sit at respective areas of the environment. Combined with additional sensor data such as image recognition information, an inference may be drawn that the respective areas include couches, chairs, beds, and the like. Devices may also be frequently placed at specific areas along with sensor data indicating that the device is being charged when placed at the specific area. Accordingly, the environmental representation may be updated to reflect position information of relevant information related to wall outlets, device chargers, etc. Once the various objects in the environment are identified, the representation may be updated including identifiers and other information (e.g., object type, sub-type, size, shape, color, etc.) corresponding to the respective objects.

Generally, output based on identified event information may be provided at one or more devices within the environment. In some cases, the primary controller device may be the device at which the output is provided based on the event information (e.g., a prompt on the user's smartphone device indicating "Someone is knocking at the front door."). Alternatively, the primary controller device may be a different device than the device at which the output is provided. For example, with reference to FIG. 10, the primary controller device may correspond to smartphone 1002. Event information may be identified corresponding to activity within the environment. In particular, the sensor framework may be configured (e.g., based on predetermined criteria such as user preferences or default settings, etc.) to alert user 1004 regarding any incoming messages if user 1004 is not actively engaged with smartphone 1002, is also not equipped with a smart watch or other wearable device, and/or if smartphone 1002 has a silent or vibrate mode active. For instance, in accordance with a determination that the smartphone is locked and stationary, determination is made that user is 1004 not actively engaged with smartphone 1002 (e.g., the smartphone is resting on a surface). Accordingly, sensor data is transmitted to the sensor framework indicating the idle state of smartphone 1002. Furthermore, to the extent any incoming messages are received at smartphone 1002, sensor data is transmitted to the sensor framework indicating there are pending messages for user 1004. As a result, determination is made as to which device in the environment is best for alerting user 1004 regarding the incoming messages. Home speaker 1006, for example, may be determined as the closest device to the user 1004. Accordingly, the event information including incoming message contents is obtained from the updated environmental representation, and an output including the incoming message details is provided to the user at home speaker 1006 (e.g., an audible output including "You have a new message from John. Would you like me to read it aloud" ?).

The sensor framework may also be utilized to respond to explicit requests or commands from a respective user. For example, a user may indicate that an item is lost, or may generally enquire about the location of an object (e.g., "Hey Assistant, where is my phone?"). Based on the request, the environmental representation is queried in order to determine a location of the referenced object. Based on reference to "my phone" and an identify verification of the requesting user (e.g., voiceprint, facial recognition, etc.), the device identifier and corresponding location coordinates are determined from the multi-dimensional representation. To the extent there are any referential objects near the target device, such objects may be included in a response description associated with the target device (e.g., "Your phone is in the middle of the living room," or "Your phone is resting on the couch.").

As the sensor framework builds historical context regarding activity within a respective environment, various trends and patterns may be used and leveraged to provide additional information to users. In some examples, a user may request (or a default setting may exist) to provide periodic summaries of activity within an environment. Over time, various information may be captured by the sensor framework that is indicative of human movement or other activity, such as device movements, device-to-device interactions, image recognition of human activity, and the like. Accordingly, movement and activity of a respective user may be generally logged and analyzed, subject to privacy considerations as discussed herein. In some cases, users may opt-in or opt-out of tracking features as desired. A user may request, for example, that no tracking occur in specific areas of an environment, during specific timeframes, with respect to individual users, and the like. In some examples, once sufficient information is captured (e.g., a threshold amount of information, an amount of information over a threshold period of time, etc.), the information is analyzed to determine patterns, routines, and other activities that a user may frequently or periodically engage in. For example, at the end of a specific time period, such as one week, the user may be prompted with an activity history such as "On average, you spent 12 hours indoors per day this week. On Wednesday, you spent an above average amount of time in the living room." Additional options may be provided to the user to view more information on the user's activity within the environment, such as options to view activity histories and summaries with respect to a particular location within the environment, a particular timeframe, and/or a particular activity (e.g., workout, watching TV, cooking, etc.).

The sensor framework may also facilitate providing proactive recommendations to a user or a group of users. Specifically, the identified event information may include identification of one or more users within an environment. Sensor data may indicate that a group of users is sitting down on a couch in front of a set-top-box and associated television display. Sensor framework may identify each user based on various methods (e.g., facial/image recognition, device identifiers, voiceprint analysis, and the like). In this example, the sensor data may indicate that one or more children are present within the group. Accordingly, age-appropriate media recommendations may be proactively provided on the television display based on the identification of younger persons in the viewing area of the television. In some examples, particular users may favor various media, such as cooking shows, music events, action movies, and the like. In such cases, if the user is identified as situated within a viewing area of the television display, set-top-box may cause recommendations, tailored to that specific user, to be provided on the display, and/or to be provided as recommendations in response to a user request (e.g., "Show me some shows I'd like").

In general, user authentication is enhanced using the sensor framework. A user may be authenticated at a particular device based on a variety of inputs, such as facial recognition, passcode entry, voiceprint, and the like. For example, user 1004 may engage with smartphone 1002, and smartphone 1002 may begin a facial recognition procedure. Once user 1004 is authenticated via facial recognition, the user may stop using smartphone 1002 for a period of time (e.g., 30 minutes). During the period of non-use of smartphone 1002, various characteristics of the environment may be monitored continuously, such as identities and locations of persons within the environment, device states, and the like. When user 1004 again begins to engage with device 1002, authentication may be maintained subject to predetermined criteria being satisfied. The predetermined criteria may include a determination that the user 1004 was the only person within the environment during the period of non-use. Alternatively, the predetermined criteria may include a determination that no others users came within a predetermined distance (e.g., 1 meter, 3 meters, 5 meters, etc.) of the device during the period of non-use. The predetermined criteria may also include a determination that the period of non-use does not exceed a threshold time period (e.g., 4 hours, 8 hours, one day, etc.). To the extent the sensor data indicates that the predetermined criteria is satisfied, the user may access the device 1002 without attempting an additional authentication procedure.

Figure 11:
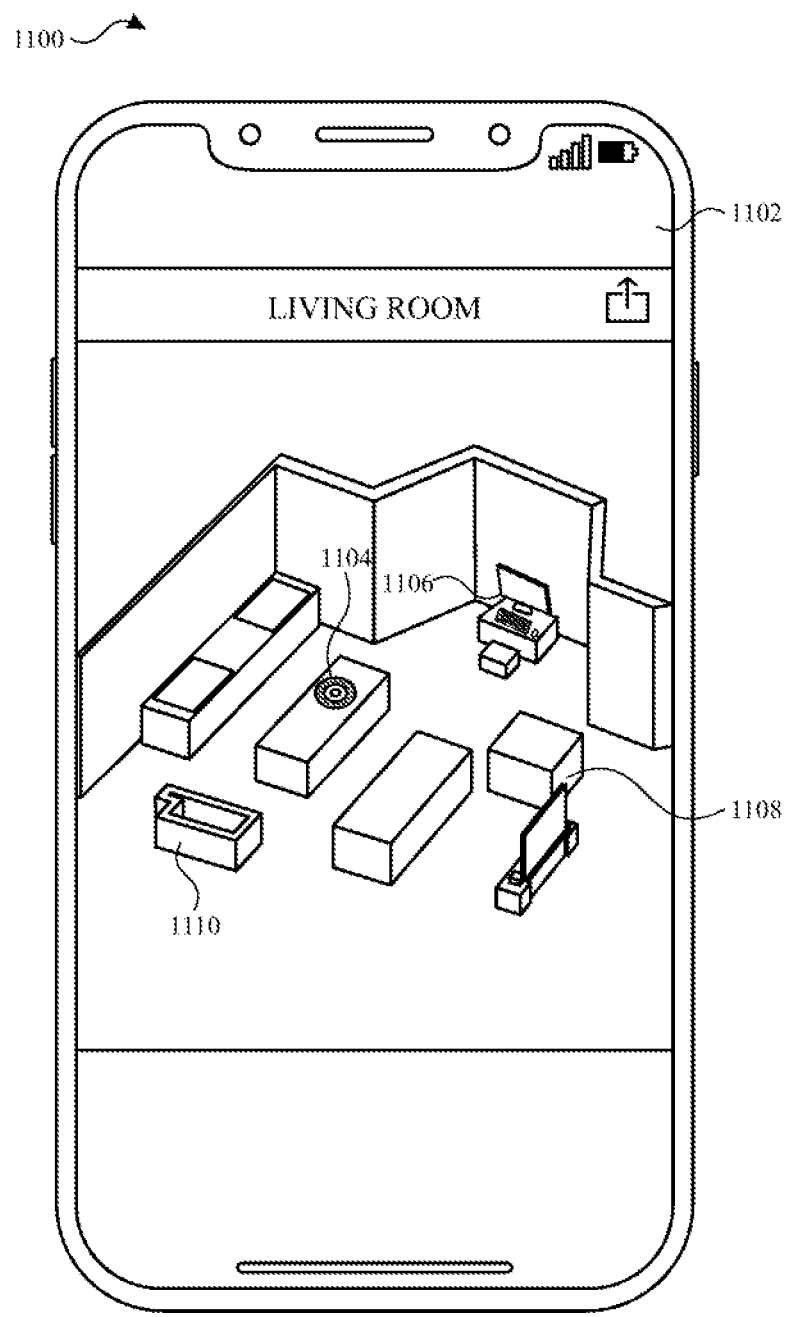
FIG. 11 illustrates an exemplary environmental representation displayed on a device, according to various examples.

With reference to FIG. 11, the sensor framework may provide a visual representation of a respective environment to a user. Generally, as described above, various inferences and other determinations are made regarding an environment, such as approximating the locations of walls, floors, stairways, furniture, appliances, etc. Once a sufficient portion of an environment is mapped, a multi-dimensional depiction of an environment is displayed to the user. For instance, smartphone 1100 may display interface 1102 to the user. Interface 1102 may include various objects, boundaries, and other features detected within the corresponding environment (e.g., the environment depicted in FIG. 10). Specifically, interface 1102 may include a general depiction of a living room portion of the environment, including representation of various furniture, walls, counters, tables, and the like. Devices within the environment may also be depicted, such as home speaker 1104, computer 1106, and set-top-box 1108 with associated display. In addition, the user may interact with the devices displayed within interface 1102. For example, the user may tap or press (e.g., long-press, short-press, etc.) on a specific device in order to view information and perform various functions. When a user taps or presses on a particular device, information regarding the selected device may be populated on interface 1102, such as device name, battery life, signal strength, playback state, usage history, and the like. The user may also initiate various functions which involve state changes at the device, such as power on, power off, volume adjustment, media playback (e.g., "next song"), light intensity adjustment, temperature adjustment (e.g., turning up heat on a thermostat), etc. In response to user selection of a particular device function, the representation of the environment may be queried to obtain a device address in order to route a corresponding command to the device using one or more communication methods (e.g., WiFi, Bluetooth, etc.).

Using sensor data, additional inferences may be drawn to build the environmental representation depicted via interface 1102. As various devices are identified using sensor data, device characteristics may be used to in order to assign names to respective objects and rooms within the environment. For example, sensor data may be received from set-top-box 1108, indicating the device was given a name from a user corresponding to "Living Room TV." Accordingly, a rule may exist such that any enclosed area (e.g., a room) with a device including "Living Room" causes the respective enclosed area to be named "Living Room" (subject to other device names in conformity with the rule). Similarly, sensor data may be received from a speaker device (not depicted), indicating the device was given a name from a user corresponding to "Bathroom Speaker." Accordingly, a rule may exist such that any enclosed area with a device including "Bathroom" causes the respective enclosed area to be named "Bathroom." The user of device 1100 may also modify or adjust aspects of the environmental representation provided via interface 1102. For example, the user may add, remove, or otherwise modify various features displayed within interface 1102. In some cases, objects may be mislabeled or otherwise misidentified, such that the user can rename objects, furniture, rooms, and the like. The user can also remove features from the environment. For example, due to an obstruction or other unique aspect of the environment, an unknown object 1110 may be placed within the environmental representation. The user may remove unknown object 1110 if there is no corresponding physical object in the environment, or if the user does not wish the object to be displayed within the environmental representation. To the extent the user wishes to add an object to the environment, the user may select a specific portion of the environment, and add details regarding the object such as name, type, size, appearance, weight, etc. The user can also add additional details regarding items already depicted within the environment (e.g., fabric of couch, brand name of stove, etc.).

In some cases, the user may be prompted to confirm or otherwise verify the placement of various objects within the environmental representation. For instance, sensor data corresponding to movement a plurality of objects may be tracked over time, such that the movement information indicates that persons, animals, and other objects never traverse a respective area of the environment. However, additional sensor data such as images and acoustic information may indicate that no object is detected at the given location, or that insufficient information is available to determine whether there is an object at the location. Accordingly, additional information may be required in order to determine if there is any special characteristic or other feature located within the specific area. For example, interface 1102 may provide a prompt to the user with an indication highlighting the respective area, including a question such as "Does this area include furniture or another object?" To the extent the user selects "Yes," the user may enter in details regarding the object such as type, size, weight, appearance, etc. For instance, there may be a floor grate or other feature within the floor of the environment that persons or pets typically do not wish to walk over.

In order to preserve privacy and other details regarding a physical environment, user identity may first be established prior to displaying interface 1102 including the representation of the environment. For example, various users may interact with interface 1102, such as users assigned to a particular account associated with the physical environment (e.g., members of a family who reside at the physical home). Users who have access and can otherwise control aspects of the account (e.g., an account administrator) may add or remove users from the particular account. As a default setting, for example, any member of the account may view, modify, add, or remove objects or characteristics of the respective environment as displayed via interface 1102. Accordingly, prior to accessing interface 1102 (e.g., prior to opening an application associated with the environmental representation), an identity of the user of device 1100 is determined. For example, the user may be prompted to authenticate via facial recognition, passcode, voiceprint, or authentication via an additional device (e.g., smart watch). In response to a successful authentication, the user may be granted access to interface 1102 to interact with the environmental representation as discussed herein. In response to one or more unsuccessful authentications, the user may not be granted access to interface 1102. Alternatively, in cases of one or more unsuccessful authentications (or in the absence of any authentication), the user may be granted limited access to interface 1102. For example, general aspects of the environmental representation may be presented to the user, such as icons for one or more devices in the environment that any user within the environment may interact with. Specifically, the account may allow any users within communicative range of home speaker 1104 and set-top box 1108 to interact with the devices, such that device interactions can take place via any device using interface 1102. General aspects of the environment may include one or more room names, but may not include any other details regarding the rooms (e.g., room contents, appearance, size, etc.). The account administrator may also customize other aspects of the environment, such that any users within the physical environment can view details regarding specific rooms of the environment, such as only the kitchen and living room. An account administrator may also add or remove specific users from various levels of access for interacting with the environment and objects within the environment via interface 1102.

Interactive interface 1102 may also be used to review history associated with activity within the environment. In general, humans, pets, and other objects may move about the environment over time. The environmental representation may include historical information regarding the movement for each respective person, pet, or other object. As discussed herein, any user may opt-in or opt-out of the movement tracking within the environment. For example, a prompt may be provided (e.g., initially, periodically, etc.) to devices within the environment in order to obtain explicit approval for movement tracking before movement tracking begins. For devices and other objects that are the subject of movement tracking, interface 1102 may include one or more affordances (not depicted) which permit the user of device 1100 to select a particular person or object. Upon selection of a person or object, the user may review historical movement information and activity associated with the selection. For instance, the user may navigate to an interface within interface 1102 that includes a summary of all persons, pets, or devices that have been detected within the environment in a given timeframe (e.g., the previous week). The user may make a particular selection, such that a summary is provided to the user regarding the activity of the selection person, pet, or device (e.g., "John was gone from Monday through Thursday, but was home most of the day on Friday"). The user may also utilize one or more controls, such as a slider bar, to adjust a time parameter to see specific locations of a person, pet, or device at a specific time. While viewing movement information of the selected item, movement activity of other items may also be shown at the respective moment in time. Interactive interface 1102 may also generally depict types of activities that various users or devices are engaged in, such as watching television, cooking, listening to music, working, exercising, etc. (e.g., a bubble with the words "cooking," "watching TV," etc.).

Generally, device 1100 may provide a variety of proactive and reactive assistance to the user. For example, recommendations for device or other object placement may be provided based on analysis of the physical environment using sensor data. First, general device information may be gathered (e.g., device type, size, power requirements, etc.). Acoustic information may then be gathered as sensor data from devices equipped with a microphone, such as a home speaker. Room area and shape may be determined based on sensor data including images and proximity sensors, such as cameras on computers, tablet, home security camera, etc. Room area may also be determined based on the acoustic information (e.g., based on sound reflections). Once room details are gathered, the area and general shape of a room may be used to provide device placement assistance. For example, the area and size of the living room depicted via interface 1102 may be determined such that an optimal placement location of an audio source can be recommended to the user. Using speaker placement guidelines (e.g., a position in an open area away from walls, angled towards sitting/gathering areas, near a power outlet, etc.), a representation of a suggested speaker location may be populated within interface 1102 such that the user is given a visual indication of the proper speaker location. Similarly, interface 1102 may suggest placement locations for a television display based on display placement guidelines (e.g., away from sunlight/windows, on a wall of a minimum threshold area, near sitting areas, etc.). Several different placement recommendations may be provided per device, based on the availability of proper placement locations as determined by placement guidelines.

In some examples, interface 1102 may provide recommendations for placing other devices such as security cameras or wireless connection equipment (e.g., a WiFi router, repeater, or mesh network equipment). In particular, various walls or other obstructions in an environment may lead to poor wireless network connectivity. Sensor data may indicate that when certain devices are placed in certain areas, wireless connectivity quickly becomes poor. Based on wireless signal analysis of an environment over time (e.g., viewing wireless connectivity strengths based on movement of devices), sensor data may be used to determined optimal WiFi equipment placement (e.g., away from sources of wireless signal degradation). Once the optimal WiFi placement locations are determined, the user may be provided with recommendations within interface 1102 for installing and/or moving WiFi equipment to more ideal locations within the environment.

In general, analysis of a given environment layout may also be used to recommend placement of other objects with the environment, such as furniture, appliances, and the like. The sensor framework may identify several pieces of furniture in a given room, such as a couch, two tables, and two chairs. Using interface 1102, the user may be provided with several different layout options including the couch, tables, and chairs, which may be based on rules for spacing and other constraints (e.g., placing a table next to at least one couch or chair, placing a touch or chair a specific distance from a display, etc.). Interface 1102 may also include recommendations for additional pieces of furniture or appliances to the extent there is additional space available, and placement of additional objects would be appropriate under the placement constraints (e.g., walkways or other high-traffic areas would not become blocked or obstructed).

Figure 12A:
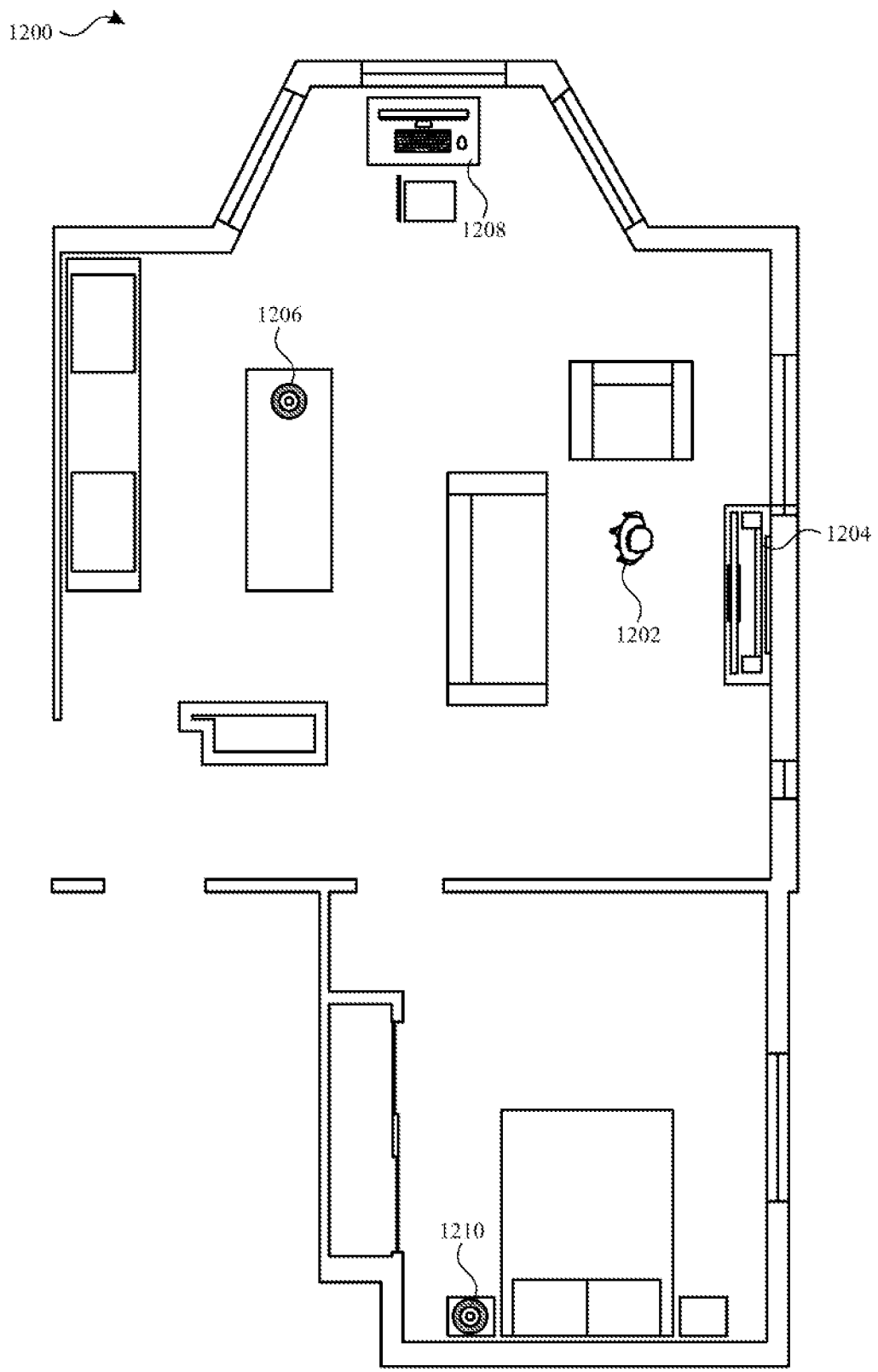
FIGS. 12A-12B illustrate an exemplary environmental representation, according to various examples.

With reference to FIG. 12A, an exemplary representation 1200 of a physical environment is depicted. In particular, representation 1200 may include a living room area with user 1202, set-top-box 1204, home speaker 1206, and computer 1208. Representation 1200 may also include a bedroom area with home speaker 1210. User 1202 may walk about the environment and may also interact with a smartphone (not depicted). User 1202 may also interact with a digital assistant using speech input. For example, user 1202 may utter a spoken trigger (e.g., "Hey Assistant") followed by a command or question (e.g., "What's the weather like today?"). Various devices in the environment may include digital assistant functionality, such as set-top-box 1204, home speaker 1206, computer 1208, home speaker 1210, and user 1202's smartphone. When user 1202 utters the spoken trigger, a response device is determined in order to facilitate digital assistant dialog with the user.

When a spoken trigger is detected, the sensor framework may be utilized in order to determine the response device for responding to the user's speech input. In particular, one or more devices within the physical environment may detect the spoken trigger using a low power process to detect the specific trigger word or phrase. Specifically, user 1202 may utter "Hey Assistant, what's the weather today?". Each of set-top-box 1204, home speaker 1206, and computer 1208 may detect the spoken trigger and corresponding question. The smartphone of user 1202 may be located in the user's pocket, for example, and may also detect the spoken trigger and question. Accordingly, the sensor data sent via the sensor framework may reflect the detection of the spoken trigger at each device. Specifically, set-top-box 1204 may transmit sensor data, to the sensor framework, including an indication that the speech was detected. Home speaker 1206 and computer 1208 may also transmit sensor data including an indication that the speech was detected. The sensor data may also include additional information used in order to determine a response device for the user's speech. For instance, set-top-box 1204 may transmit sensor data including the state of set-top-box 1204, such as "Idle" or "Sleep Mode." Home speaker 1206 may transmit sensor data including the state of home speaker 1206, such as "On" or "Media Playback." Home speaker 1206 may also transmit sensor data including acoustic information such as the direction of the speech input and approximate distance of the speech origin from home speaker 1206. Computer 1208 may transmit sensor data including the state of computer 1208, such as "On," or "Idle." Computer 1208 may also transmit sensor data including gaze and head orientation information captured from a camera within computer 1208. In particular, the gaze information may indicate the general direction of a user's gaze detected within the environment, such as user 1202's gaze. The head orientation information may also indicate the general direction of the user's head. In this example, the gaze information and head orientation information may indicate that the user is looking north-west, in the direction of home speaker 1206.

Based on the sensor data associated with the representation of the physical environment, a confidence score may be determined for each device in the environment. The confidence score may reflect a confidence as to whether the detected speech is directed to a respective device. For instance, the primary controller device, such as user 1202's smartphone, may determine the confidence level for each device based on the sensor data. Alternatively, each individual device may determine the confidence level from it's own sensor data, and publish the confidence value as sensor data. The confidence level may also be determined in a variety of ways. For instance, in response to detecting (e.g., at a controller device) sensor data indicating reception of speech input at one or more devices, the representation of the physical environment may be retrieved in order to analyze sensor data from all other devices at which the speech was also detected. In addition, sensor data (e.g., proximity information) may also be gathered from devices that are not equipped with a microphone, but are in the same general location as the speech origin (e.g., a thermostat).

Various factors may affect the confidence as to whether the speech is directed to a particular device. The confidence level for a device in an "off" state may be weighted lower than devices in higher states such as "idle," "sleep," or "on." The position of the user may also affect the confidence level, such that the confidence level for a respective device is weighted higher if the user is closer to the device (and lower if the user is farther from the device). The quality of the user's speech may also affect the confidence level. For example, if the user's speech is unclear or muffled (e.g., the device is in the user's pocket, in another room, etc.), the confidence level may be relatively lower. The orientation of a device may also increase or decrease a confidence level (e.g., if a smartphone is face down on a surface, the confidence may be relatively lower). The direction of the user's speech may also affect the confidence level, such that if user's speech is directed at or near a respective device, the associated confidence for that device may be relatively higher. In contrast, if the user's speech is directed away from a particular device, the associated confidence may be relatively lower. The user's gaze direction may also affect the confidence level. If a user's gaze is directed at or near a respective device, the associated confidence for that device may be relatively higher, and if the user's gaze is directed away from a particular device, the associated confidence may be relatively lower. In addition, the determination as to whether a user's speech and gaze is directed to a particular device may not be made by the particular device, but rather, may be made by another device. In this example, computer 1208 may determine that both user 1202's speech and user 1202's gaze are directed toward home speaker 1206, and include the same information as sensor data. Various devices may also be generally weighted higher than other devices given an inherent nature for users to communicate with such devices. For example, users may generally direct digital assistant requests more frequently to home speakers than set-top-boxes and associated displays, such that the confidence level for a home speaker is weighted higher than a confidence level for a set-top box.

Here, based on the obtained sensor data, confidence levels may be determined for each of set-top-box 1204 (50%), home speaker 1206 (95%), computer 1208 (55%), and user 1202's smartphone (25%). In particular, home speaker 1206 may have the highest confidence level, given that user 1202's speech and gaze direction are directed towards home speaker 1206, as well as a relatively close distance between user 1202 and home speaker 1206. In contrast, the confidence level for user 1202's smartphone may be the lowest confidence level, given an "idle" state and an orientation indicative that the smartphone is in user 1202's pocket. Computer 1208 and set-top-box 1204 may have intermediate confidence scores, given relatively close distance to the speech origin, but user speech and gaze directed elsewhere. Accordingly, home speaker 1206 may be selected as the response device for responding to user 1202's speech utterance. For example, a primary controller device, such as user 1202's smartphone, may cause home speaker 1206 to respond to the speech input. The response may include "The weather in Cupertino is 75 degrees and sunny." Alternatively, to the extent the primary controller device is determined as having the highest confidence level, the primary controller device may respond to the user as the response device. In some cases, the device determined as having the highest confidence score may not be selected as the response device.

In certain cases, it may be appropriate to output a response to the user at a specific device. For example, home speaker 906 may be associated with the highest confidence level, although the user may request or refer to (or a default setting may require) a specific device as providing an output (e.g., "Hey Assistant, play my favorite songs on the bedroom speaker"). As a result, one or more devices (such as the primary controller device, the device with the highest confidence level, etc.) may cause the specified device to provide the output by providing an instruction to the appropriate device. Similarly, in some cases, the user may direct speech to a device that does not have digital assistant capabilities. For example, the user gaze towards a thermostat and utter "Hey Assistant, please turn the temperature down to 68 degrees Fahrenheit." Based on the speech input, determination is made that the thermostat device is associated with a highest confidence level and thus is selected as the response device. However, to the extent the thermostat device does not include digital assistant capabilities, a further determination is made whether the thermostat includes an API to permit other devices on to send instructions to the thermostat (e.g., over WiFi, Bluetooth, etc.). If the thermostat does include an API to permit such instructions, an instruction is sent to the thermostat device in accordance with the user's request. For example, the primary controller device (e.g., user 1202's smartphone) may send an instruction via API to the thermostat through the WiFi network, Bluetooth, etc. Alternatively, another device (e.g., a device having a second highest confidence level such as home speaker 1206) may send the instruction via API to the thermostat device. In addition, a device, such as user 1202's smartphone or home speaker 1206, may provide an acknowledgement to the extent the target device is unable to provide sufficient acknowledgement to the user. For example, home speaker 1206 may provide confirmation that a task is being executed in accordance with the user's request (e.g., "Got it. Adjusting the temperature to 68 degrees.")

In order to facilitate the request-response process using the representation of the physical environment, a primary controller device may receive dynamic updates regarding the representation of the environment. For example, primary controller device may subscribe to any sensor data including data types for indications that speech input was detected or otherwise received at a particular device. Accordingly, when a particular device detects speech within the environment, the primary controller device receives this information within sensor data via the sensor framework. In this manner, the primary controller device may control which types of sensor data are received and processed, and which sensor data can be ignored or quickly discarded.

Once a response device is selected, various outputs may be provided to the user depending on the user request. User requests may include general questions or commands, or may refer specifically to aspects of the surrounding physical environment. For example, the speech input may include one or more object references corresponding to objects, persons, pets, etc., identified in the environment. For instance, the user may utter "Hey Assistant, is anyone home right now?" In response to the request, the environmental representation is queried via the sensor framework in order to resolve the user query. In particular, recent and/or live sensor data is analyzed to determine whether any object representations exist within the environmental representation corresponding to people. In some cases, one or more people may be present in other areas of the environment, such as a different room or different floor of the environment. A home speaker (e.g., a basement speaker) may detect a wireless connection from another device in the home, such as a smartphone associated with a user profile for "John." Sensor data from the smartphone may indicate that the phone was recently accessed and a positive authentication was completed for John at the smartphone (e.g., using facial recognition, passcode, voiceprint, etc.). Using this information, a primary controller device may infer that user "John" is present in the home, and provide an output to the user such as "Yes, John is in the basement." Settings may also require a more definitive confirmation that specific users or objects are present in order to respond to such a request. For example, image recognition confirmation may be required in order to confirm whether a user or object is present in response to a user request. In such as case, the sensor framework may be queried for any data objects including positive identification of persons within the home. A computer located in the basement may transmit a sensor data object indicating an individual identified as John is present in the basement (e.g., via facial recognition).

Various other types of requests may be facilitated using the sensor framework and environmental representation, such as request for a date and time when an object, person, or pet was last observed (e.g., "When was John here last?"), a request to identify people in the home at a specific time in the past (e.g., "Who was here last Saturday?"), a question regarding a characteristic of the environment (e.g., "How many square feet is this room?", "What's the temperature downstairs" ?), a question regarding a characteristic of an object within the environment (e.g., "What's the battery life on my computer?", "How long is this couch?"), and the like. Based on the particular speech request, various parameters may be extracted from the request and used when analyzing the environmental representation. Specifically, an intent for the query "When was John here last?" may be resolved to request for a date and time parameter corresponding to presence of an individual "John." The environmental representation history may include past sensor data corresponding to a device belonging to "John" (e.g., a primary account on the device"). The past sensor data may indicate that the respective device position moved outside of the physical environment while concurrently disconnecting from the WiFi network at a specific date and time. Accordingly, the response device may provide the specific date and time to the user, such as "It appears John left around 8:15 AM this morning."

Figure 12B:
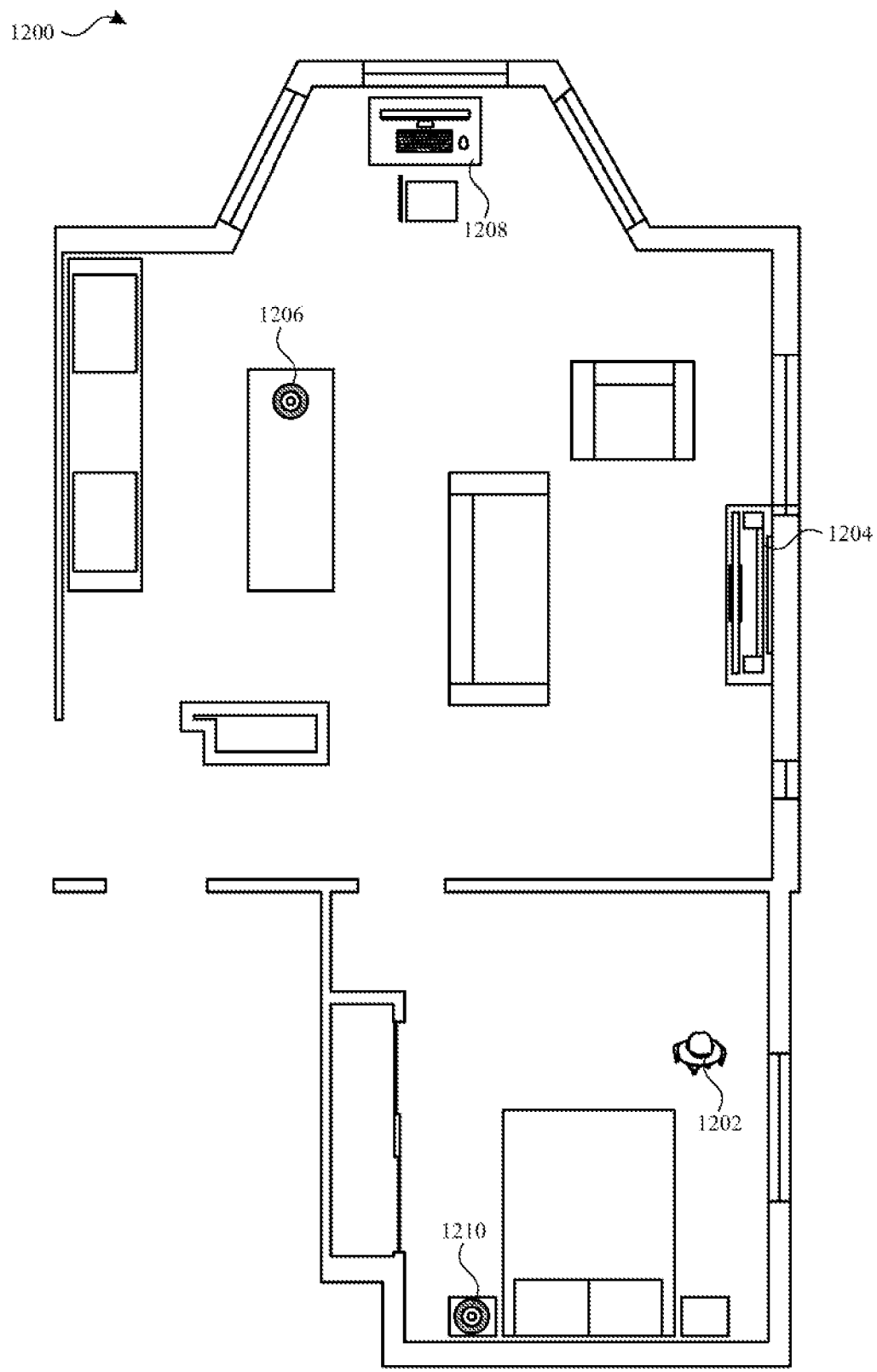

With reference to FIG. 12B, the sensor framework may also be utilized to provide the user with proactive notifications or other messages based on user location within the environment. Generally, a variety of different types of notifications, alerts, messages, and other information can be proactively provided to the user, or otherwise caused to be provided to the user by an external source such as another user, a third party service, etc. Prior to the information being provided to the user, a target device is first determined for outputting the appropriate information. In general, if one or more predetermined criteria are met, a target device may be selected without the need to query the sensor framework and environmental representation. Satisfaction of the predetermined criteria may include a determination that only one device would be appropriate to convey the specific information to the user. In this case, the device may be selected and the information conveyed to the user accordingly. The predetermined criteria may not be satisfied when multiple devices are capable of clearly providing the information to the user.

As an example, the user may have configured a setting indicating that the user wishes to be notified whenever rain, snow, or other inclement weather is expected at the home location. In response to a determination that the information is available to be provided to the user (e.g., an external weather server indicates rain is approaching), a determination is made whether the predetermined criteria is satisfied prior to providing the information to the user. User 1202 may be carrying a personal device (e.g., smartphone) and be located in a bedroom area of the environment. The bedroom area may also include home speaker 1210. In order to determine whether any devices are available to provide the information to the user, various connections and wireless signals may be used in order to communicate between devices. Specifically, the smartphone carried by user 1202 may emit an ultrasonic signal. Next, the environmental representation is queried to determine if any devices associated with the sensor framework detected the ultrasonic signal. To the extent sensor data indicates that a particular device (and no additional devices) detected the ultrasonic signal, a second determination is made using the sensor data. Specifically, a determination is made whether the particular device also includes a wireless connection to the smartphone (e.g., Bluetooth). To the extent both conditions are met, the predetermined criteria is deemed satisfied, and the particular device is selected as the target device to provide the weather information to the user.

Alternatively, if the sensor data indicates that multiple devices detected the ultrasonic signal, a determination is then made whether any of the multiple devices has a wireless connection (e.g., Bluetooth) to the smartphone. If one particular device (and not more) is determined from the multiple devices as both having detected the ultrasonic signal and having the wireless connection to the device, the predetermined criteria is deemed satisfied, and the particular device is selected as the target device to provide the weather information to the user. In this example, both home speaker 1210 and home speaker 1206 may detect the ultrasonic signal emitted from the smartphone. However, only home speaker 1210 may have a wireless connection to smartphone carried by user 1202. Accordingly, the predetermined criteria may be deemed satisfied and the weather information is provided to user 1202 via home speaker 1210.

In some cases, the predetermined criteria also includes a condition that the target device must be capable of providing the pending information in a suitable format, for example, based on identification of media parameters corresponding to both the output and the candidate devices. For example, if the information must be relayed in text-type format, then devices such as a home speaker will not satisfy the predetermined criteria since a home speaker may generally not be capable of displaying text. Similarly, if the information must be relayed in a large file-size format (e.g., 8K video), the certain devices such as smart watches and various smartphones may not satisfy the predetermined criteria.

In some cases, returning to FIG. 12A, user 1202's device may be positioned such that multiple devices both detect the ultrasonic signal and have a wireless connection with the smartphone. Specifically, each of set-top box 1204, home speaker 1206, and computer 1208 may detect the ultrasonic signal and have a wireless connection with the smartphone of user 1202. Alternatively, determination may be made that there are no devices which detected the ultrasonic signal, but multiple devices have a wireless connection to the smartphone. As a result, the multiple devices may be selected as candidate devices from which to choose a target device for relaying the information to the user. In order to select the target device, methods similar and/or the same to those discussed above with respect to FIG. 12A may be used to resolve which device should be selected as the target device to provide the information to the user, assuming the device is capable of providing the information in the required format. For example, the environmental representation may be queried to determine which device is closest to the smartphone of user 1202. Distance between respective devices and the smartphone may be determined in part based on UWB, WiFi connection strength, Bluetooth connection strength, etc. Each respective device may also include, as sensor data to the sensor framework, a set of coordinates identifying the device position in multi-dimensional space within the environment. The difference in coordinates between each respective device and the smartphone may also be used to determine the appropriate distance. Other sensor data may also be utilized in order to determine a target device for providing the information to the user, such as user gaze, head orientation, favorite/saved devices, default devices, devices with which the user has recently or frequently interacted with, and the like.

In some cases, instead of the smartphone emitting the ultrasonic signal, one or more respective devices in the environment may periodically emit an ultrasonic signal, such that the predetermined criteria involves a determination whether the device being carried by user 1202 (e.g., the smartphone) detected the ultrasonic signal. Accordingly, the environmental representation may be queried to determine whether sensor data indicates that the device detected an ultrasonic signal, and whether the smartphone has a wireless connection to such devices.

Once a target device is selected, the respective output is provided to the user. Providing the output may include the primary controller device sending an instruction to the target device to provide the output. Various types of outputs may be provided to the user. For example, another user may create a message for user 1202, such as creating a message at one of the devices within the device environment or a different device outside of the environment. The message may be created using text, audio, video, haptic outputs, and the like. The identified message may then be provided to the user in the same format or a different format than the format originally created by the other user. For instance, the other user may interact with home speaker 1206 by speaking "Hey Assistant, leave a message for John saying I'll be back in a few hours." Alternatively, the other user may type the message into another device such as computer 1208. Once a target device is selected based on the message, the target device may output (audibly or textually) "You received a new message at 8:15 AM from Mary that reads 'I'll be back in a few hours.'" In some cases, the output message may also include recorded speech from the other user.

FIGS. 13-16 illustrate processes 1300, 1400, 1500, and 1600 for the integrated sensor framework according to various examples. Processes 1300-1600 are performed, for example, using one or more electronic devices implementing a digital assistant. In some examples, processes 1300-1600 are performed using a client-server system (e.g., system 100), and the blocks of process 1300-1600 are divided up in any manner between the server (e.g., DA server 106) and a client device. In other examples, the blocks of processes 1300-1600 are divided up between the server and multiple client devices (e.g., a mobile phone and a smart watch). Thus, while portions of processes 1300-1600 are described herein as being performed by particular devices of a client-server system, it will be appreciated that processes 1300-1600 are not so limited. In other examples, processes 1300-1600 is performed using only a client device (e.g., user device 104) or only multiple client devices. In processes 1300-1600, some blocks are, optionally, combined, the order of some blocks is, optionally, changed, and some blocks are, optionally, omitted. In some examples, additional steps may be performed in combination with the process 1300-1600.

Figure 13:
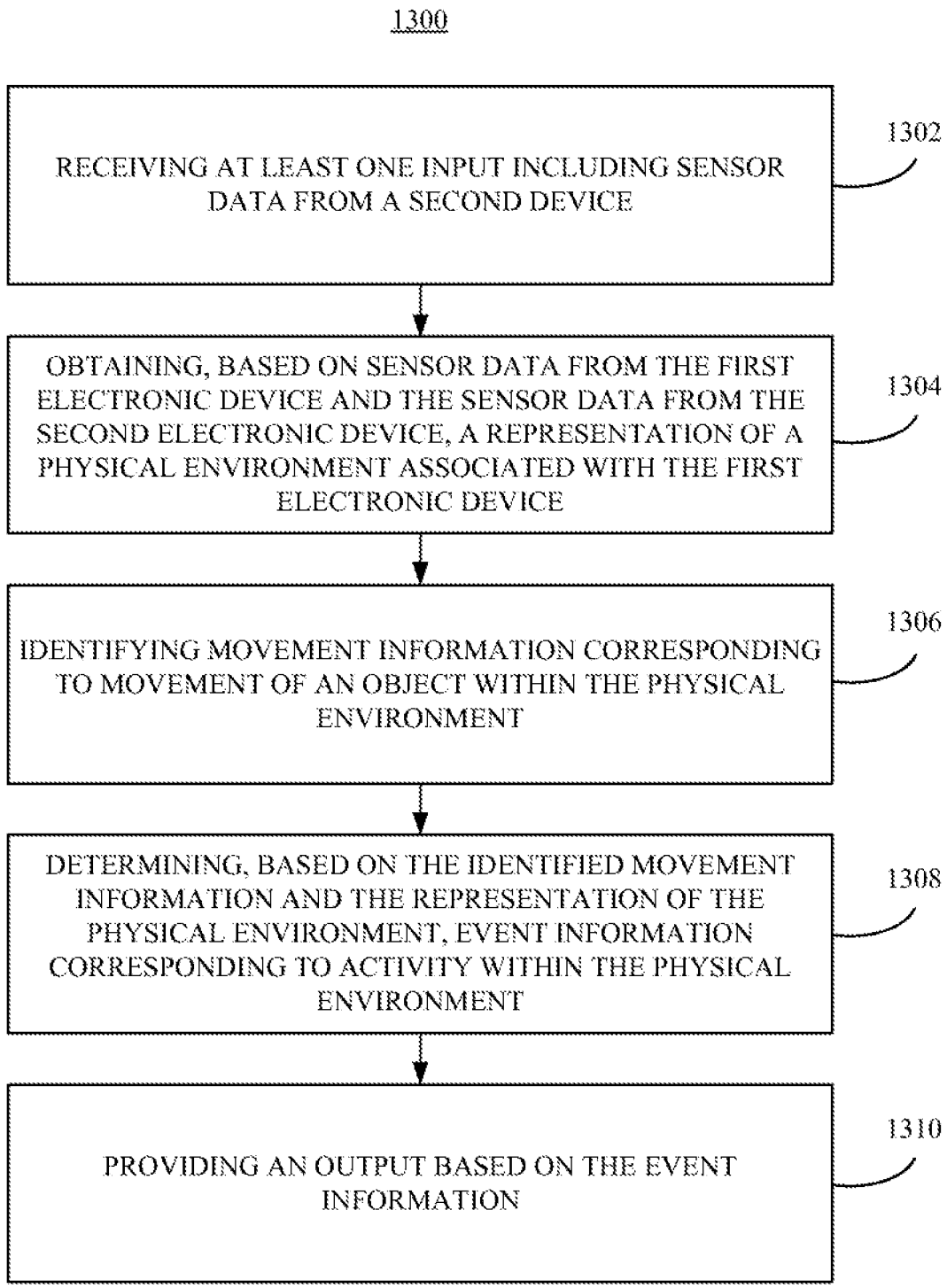
FIG. 13 illustrates an exemplary process for an integrated sensor framework, according to various examples.

With reference to FIG. 13, at block 1302, a first electronic device receives at least one input including sensor data from a second device. In some embodiments, the sensor data from the second device includes at least one of a distance between the second device and the object, a movement trajectory of the object, a gaze direction of a person within the physical environment, audio content, and a speech direction.

By gathering sensor data such as speech and gaze direction, the system enhances device functionality by leveraging additional signals for building an environmental representation. Analyzing these additional signals makes the device more efficient by creating a comprehensive environmental representation, thus assisting the user with locating information. Thus, these features reduce power usage and improve battery life of the device by enabling the user to use the device more quickly and efficiently.

At block 1304, first electronic device obtains, based on sensor data from the first electronic device and the sensor data from the second device, a representation of a physical environment associated with the first electronic device. In some embodiments, obtaining the representation of the physical environment includes generating, based on a plurality of sets of sensor data from a plurality of devices, a multi-dimensional representation of the physical environment, wherein the multi-dimensional representation of the physical environment includes a plurality of locations corresponding to a plurality of objects identified based on the plurality of sets of sensor data. In some embodiments, the representation of the physical environment includes at least one approximation of a wall boundary within the physical environment. In some embodiments, first electronic device identifies, from the at least one input, sensor data including identification of a plurality of respective objects within the physical environment, wherein the plurality of respective objects are not electronic devices, and the representation includes a plurality of identifiers corresponding to the plurality of respective objects. In some embodiments, first electronic device identifies, from the at least one input, sensor data including a device location corresponding to a respective device within the physical environment, and determines, based on the device location, an approximation of a second object adjacent to the respective device, wherein the representation of the physical environment includes the approximation.

By approximating objects and boundaries based on existing data, the system enhances device functionality by building a comprehensive environmental representation. A robust environmental representation makes the device more efficient by assisting the user with locating information. Thus, these features reduce power usage and improve battery life of the device by enabling the user to use the device more quickly and efficiently.

At block 1306, first electronic device identifies movement information corresponding to movement of an object within the physical environment. In some embodiments, the object corresponds to one of a person, the first electronic device, or a different electronic device. In some embodiments, first electronic device receives, as sensor data from a respective device, authentication information corresponding to a user of the respective device, and while identifying movement information corresponding to movement of the respective device, maintains an authentication corresponding to the user in accordance with a determination that a predetermined criteria is satisfied. In some embodiments, the predetermined criteria includes a condition that the user is the only person within the physical environment. In some embodiments, the predetermined criteria includes a condition that the user is the only person within a predetermined distance of the respective device. In some embodiments, identifying movement information corresponding to movement of an object within the physical environment includes, during a period of time, tracking movement of an object around the physical environment based on sensor data from a plurality of devices. In some embodiments, determining event information corresponding to activity within the physical environment comprises determining at least one pattern based on the tracked movement of the object. In some embodiments, providing the output includes providing, based on the tracked movement, an activity summary associated with the period of time.

By facilitating authentication using the environmental representation, the system enhances device functionality by reducing unnecessary authentications when appropriate. Reducing unnecessary authentications makes the device more efficient by reducing overall computing resources. Thus, these features reduce power usage and improve battery life of the device by enabling the user to use the device more quickly and efficiently.

At block 1308, first electronic device determines, based on the identified movement information and the representation of the physical environment, event information corresponding to activity within the physical environment. In some embodiments, in accordance with a determination that the event information satisfies a predetermined criteria, first electronic devices causes a respective device to provide a respective output. In some embodiments, in accordance with a determination that the event information includes identification of a specific person, first electronic device provides a content recommendation based on the specific person.

By providing content recommendations based on detected identifies, the system enhances device functionality by providing more relevant information to users. Providing relevant event information makes the device more efficient by reducing the amount of time spent by the user in locating information. Thus, these features reduce power usage and improve battery life of the device by enabling the user to use the device more quickly and efficiently.

At block 1310, first electronic device provides an output based on the event information. In some embodiments, first electronic device receives a user input corresponding to a respective object, wherein the user input includes an indication that the respective object is lost, identifies movement information corresponding to movement of the respective object, and provides, as the output, an indication that the respective object is found and a location of the respective object. In some embodiments, providing an output based on the event information includes sending information to a second electronic device, and causing the output to be provided at the second electronic device based on the sent information. In some embodiments, first electronic device identifies, based on the at least one input, an unknown object, wherein the event information corresponding to activity within the physical environment includes an identification that the unknown object corresponds to an unknown person, and provides, as the output, an indication of the unknown person.

By providing alerts regarding unknown or lost objects, the system enhances device functionality by providing highly relevant information to a user. Providing relevant information makes the device more efficient by reducing the amount of time spent by the user in locating information. Thus, these features reduce power usage and improve battery life of the device by enabling the user to use the device more quickly and efficiently.

Figure 14:
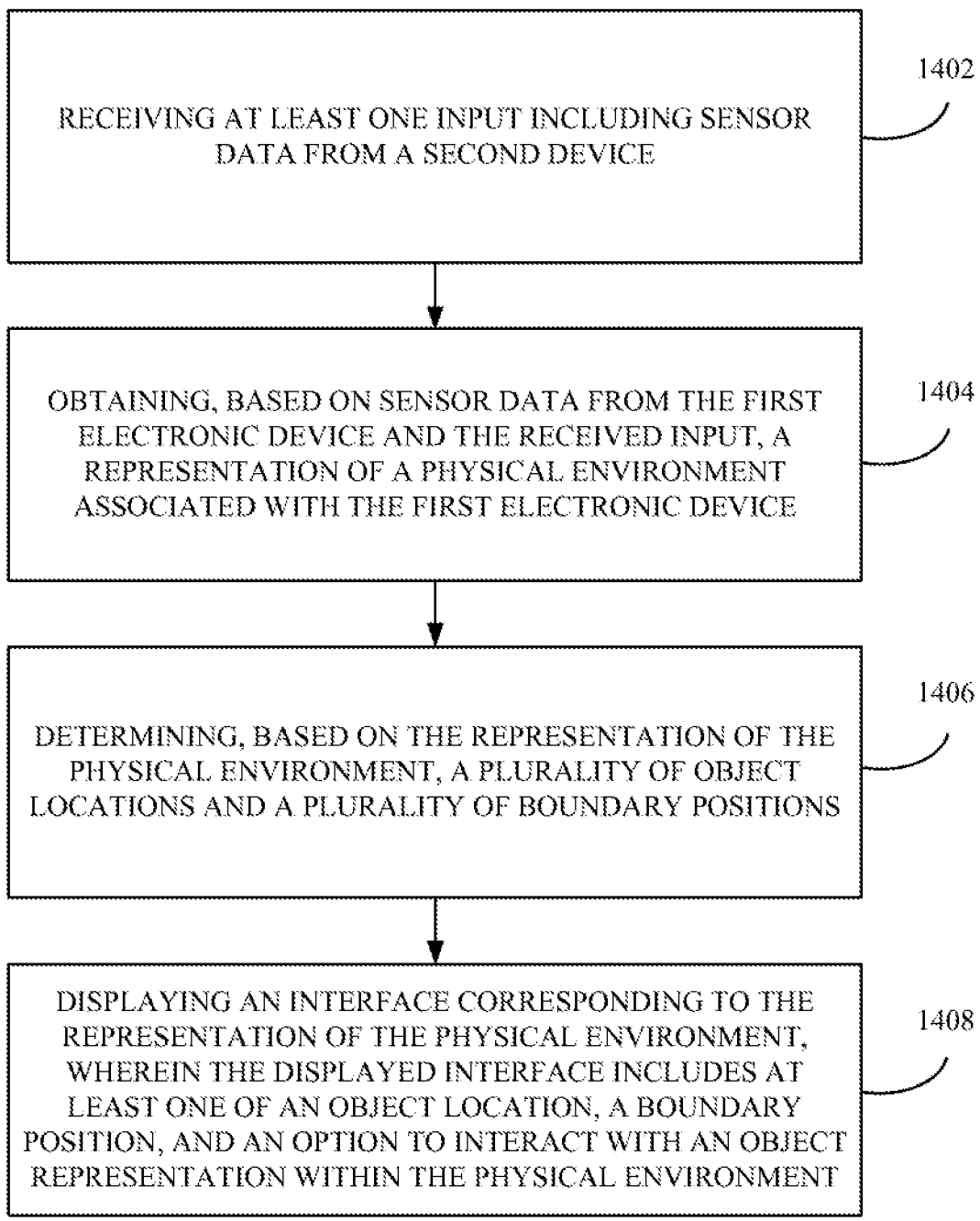
FIG. 14 illustrates an exemplary process for an integrated sensor framework, according to various examples.

With reference to FIG. 14, at block 1402, first electronic device receives at least one input including sensor data from a second device. At block 1404, first electronic device obtains, based on sensor data from the first electronic device and the received input, a representation of a physical environment associated with the first electronic device. In some embodiments, first electronic device identifies, based on the received input, a name of a respective device, and in accordance with a determination that the name of the respective device satisfies a predetermined criteria, determining a respective room type based on name of the respective device. In some embodiments, first electronic device identifies, based on the received input, placement of a respective device at a specific location within the physical environment, and in accordance with a determination that the device placement satisfies a predetermined criteria, determines a respective object location based on the specific location.

By identifying object types to determine a room type, the system enhances device functionality by leveraging additional signals for building an environmental representation. Analyzing these additional signals makes the device more efficient by creating a comprehensive environmental representation, thus assisting the user with locating information. Thus, these features reduce power usage and improve battery life of the device by enabling the user to use the device more quickly and efficiently.

At block 1406, first electronic device determines, based on the representation of the physical environment, a plurality of object locations and a plurality of boundary positions. In some embodiments, first electronic device identifies, from the received input, acoustic information corresponding to the physical environment, and determines the plurality of object locations and the plurality of boundary positions based on the acoustic information. In some embodiments, over a period of time, first electronic device receives a plurality of inputs including sensor data from the second device, identifies, from the plurality of inputs, movement patterns corresponding to one or more persons within the physical environment, and determines the plurality of object locations and the plurality of boundary positions based on the movement patterns. In some embodiments, in response to a user selection of an option to adjust the representation of the physical environment, wherein the user selection includes identification of a specific area of the physical environment, first electronic device disables tracking of movement information corresponding to movement of an object within the a specific area of the physical environment.

By permitting a user to customize tracking within an environment, the system enhances device functionality by reducing unnecessary tracking where appropriate. Reducing unnecessary tracking makes the device more efficient by conserving computing resources. Thus, these features reduce power usage and improve battery life of the device by enabling the user to use the device more quickly and efficiently.

At block 1408, first electronic device displays an interface corresponding to the representation of the physical environment, wherein the displayed interface includes at least one of an object location, a boundary position, and an option to interact with an object representation within the physical environment. In some embodiments, first electronic device determines an identity of a user of the first electronic device, and in accordance with a determination that the identity satisfies predetermined criteria, displays the interface including a first representation of the physical environment, and in accordance with a determination that the identity does not satisfy the predetermined criteria, displays the interface including a second representation of the physical environment different from the first representation of the physical environment. In some embodiments, first electronic device determines, based on the representation of the physical environment, a plurality of candidate device locations, and displays, within the interface, at least one candidate device location of the plurality of candidate device locations. In some embodiments, the plurality of candidate device locations include a plurality of locations based on acoustic reception quality for a speaker-type device. In some embodiments, the plurality of candidate device locations include a plurality of locations based on viewer visibility for a screen-type device. In some embodiments, the plurality of candidate device locations include a plurality of locations based on capture area for a camera-type device. In some embodiments, the plurality of candidate device locations include a plurality of locations based on wireless signal quality for a network-type device.

By offering device location suggestions, the system enhances device functionality by providing relevant and useful placement information to users. Providing useful device placement information makes the device more efficient by allowing devices to communicate and interoperate for efficiently. Thus, these features reduce power usage and improve battery life of the device by enabling the user to use the device more quickly and efficiently.

In some embodiments, first electronic device identifies movement information corresponding to movement of an object within the physical environment, displays, within the interface, an option to review history associated with the representation of the physical environment, and in accordance with a user selection of the option to review history associated with the representation of the physical environment, displays, within the interface, the identified movement information. In some embodiments, first electronic device identifies movement information corresponding to movement of a plurality of objects within the physical environment, and displays, within the interface, a summary based on the identified movement information. In some embodiments, first electronic device receives, via the interface, a user selection to interact with an object representation corresponding to a respective device within the physical environment, and in response to the user selection, displays additional information associated with the object. In some embodiments, the additional information includes at least one of a battery life, a signal strength, a playback state, an option to enable a device state, and an option to disable a device state. In some embodiments, first electronic device identifies movement information corresponding to movement of a plurality of objects within the physical environment, determines, based on the identified movement information, a plurality of candidate object locations, and displays, within the interface, at least one candidate object location of the plurality of candidate object locations. In some embodiments, first electronic device provides, within the displayed interface, an option to adjust the representation of the physical environment, and in response to a user selection of the option to adjust the representation of the physical environment, removes at least one object location or at least one boundary position from the representation of the physical environment.

By facilizing historical review of activity within an environment, the system enhances device functionality by allowing a user to quickly locate highly relevant information. Access to environmental history thus makes the device more efficient by helping users locate information more quickly and thus reducing device usage time. Thus, these features reduce power usage and improve battery life of the device by enabling the user to use the device more quickly and efficiently.

Figure 15:
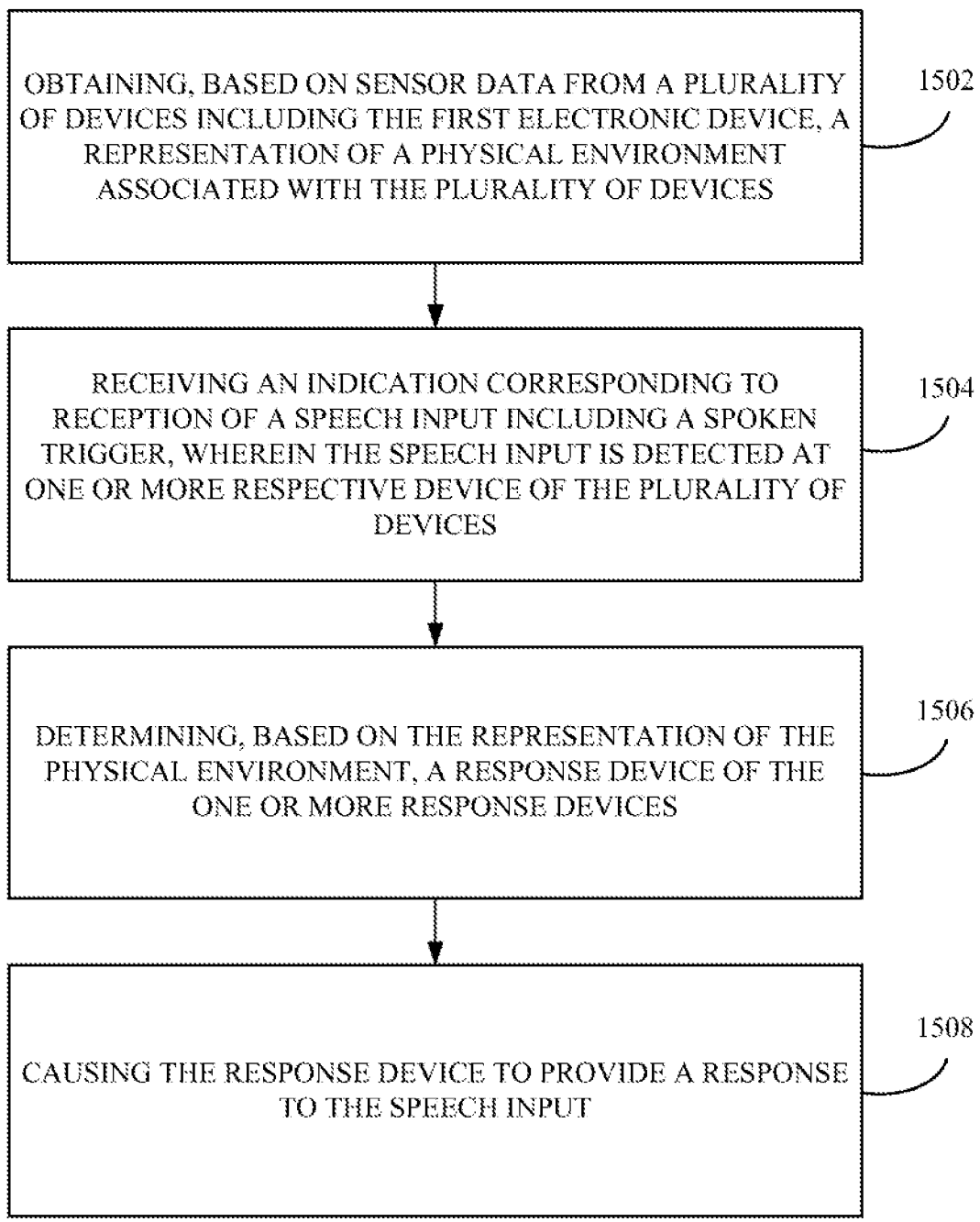
FIG. 15 illustrates an exemplary process for an integrated sensor framework, according to various examples.

With reference to FIG. 15, at block 1502, first electronic device obtains, based on sensor data from a plurality of devices including the first electronic device, a representation of a physical environment associated with the plurality of devices. In some embodiments, first electronic device receives a subscription request corresponding to the representation of the physical environment, wherein the subscription request includes identification of at least one data type, detects, based on the at least one data type, an updated representation of the physical environment, and in response to detecting the update, obtains the updated representation of the physical environment.

By facilitating subscription requests to the sensor framework, the system enhances device functionality by focusing on only relevant data types within the environmental representation. Focusing on relevant information makes the device more efficient by reducing unnecessary network traffic and computing resources. Thus, these features reduce power usage and improve battery life of the device by enabling the user to use the device more quickly and efficiently.

At block 1504, first electronic device receives an indication corresponding to reception of a speech input including a spoken trigger, wherein the speech input is detected at one or more respective devices of the plurality of devices. In some embodiments, in response to receiving the indication corresponding to reception of the speech input including the spoken trigger, first electronic device retrieves the representation of the physical environment.

By retrieving the environmental representation in response to a speech request, the system enhances device functionality by ensuring that updated environmental information is used in response to the speech request. Using up-to-date environmental information makes the device more efficient by reducing errors and follow-up interactions by a user. Thus, these features reduce power usage and improve battery life of the device by enabling the user to use the device more quickly and efficiently.

At block 1506, first electronic device determines, based on the representation of the physical environment, a response device of the one or more respective devices. In some embodiments, first electronic device determines a particular device having a highest confidence score of the one or more respective devices, wherein the particular device is different from the response device. In some embodiments, first electronic device determines a particular device having a highest confidence score of the one or more respective devices, wherein the particular device corresponds to the first electronic device, and the response device corresponds to the first electronic device, and outputs the response at the first electronic device. In some embodiments, determining a response device includes determining that the speech input is directed to a first particular device of the plurality of devices, and in accordance with a determination that the particular device includes a digital assistant, identifying the particular device as the response device. In some embodiments, in accordance with a determination that the first particular device does not include a digital assistant, first electronic device determines whether the first particular device includes an application programming interface accessible by a second particular device of the plurality of devices, and in accordance with a determination that the particular device includes the application programming interface, identifies the second particular device as the response device.

By leveraging an API of devices that do not include digital assistants, the system enhances device functionality by increasing the number of devices that a user may interact with. Maximizing device interaction options makes the framework more efficient by increasing the chances of a successful user-device exchange. Thus, these features reduce power usage and improve battery life of the device by enabling the user to use the device more quickly and efficiently.

In some embodiments, determining a response device of the one or more respective devices includes, for each respective device of the one or more respective devices, determining a confidence score, wherein the confidence score is based on a confidence whether a user of the speech input intends the speech input to be directed towards the respective device. In some embodiments, first electronic device determines, from the representation of the physical environment, whether a user gaze is directed to a first particular device of the one or more respective devices, wherein the confidence score for the first particular device is based on the user gaze determination. In some embodiments, a direction of the user gaze is determined by one of the first particular device of the one or more respective devices or a second particular device of the one or more respective devices. In some embodiments, first electronic device determines, from the representation of the physical environment, whether a user's head is oriented towards a first particular device of the one or more respective devices, wherein the confidence score for the first particular device is based on the head orientation determination. In some embodiments, the orientation of the user's head is determined by one of the first particular device of the one or more respective devices or a second particular device of the one or more respective devices. In some embodiments, first electronic device determines, from the representation of the physical environment, a speech direction of the speech input, wherein the confidence score for a first particular device is based on whether the speech direction is oriented towards the first particular device. In some embodiments, first electronic device determines, from the representation of the physical environment, an origin position of the speech input within the physical environment, wherein the confidence score for a first particular device is based on a distance between the first particular device and the origin position.

By using sensor data such as speech and gaze direction, the system enhances device functionality by leveraging additional signals for identifying a target device. Analyzing these additional signals makes the device more efficient by increasing accuracy in selecting a target device. Thus, these features reduce power usage and improve battery life of the device by enabling the user to use the device more quickly and efficiently.

At block 1508, first electronic device causes the response device to provide a response to the speech input. In some embodiments, in accordance with a determination that the speech input includes an object reference, first electronic device identifies a respective object, from the representation of the physical environment, corresponding to the object reference, and provides, as the response to the speech input, an output based on the identified object. In some embodiments, the object reference includes a reference to one or more of a person, an animal, a furniture object, and a device object. In some embodiments, in accordance with a determination that the speech input includes a characteristic of the physical environment, first electronic device identifies a respective characteristic, from the representation of the physical environment, corresponding to the characteristic included in the speech input, and provides, as the response to the speech input, an output based on the identified characteristic. In some embodiments, the characteristic included in the speech input includes a characteristic corresponding to one or more of a temperature, a size, and a color.

By using the environmental representation as context for user requests, the system enhances device functionality by improving intent determination. Improving intent determination makes the device more efficient by increasing accuracy for language processing. Thus, these features reduce power usage and improve battery life of the device by enabling the user to use the device more quickly and efficiently.

Figure 16:
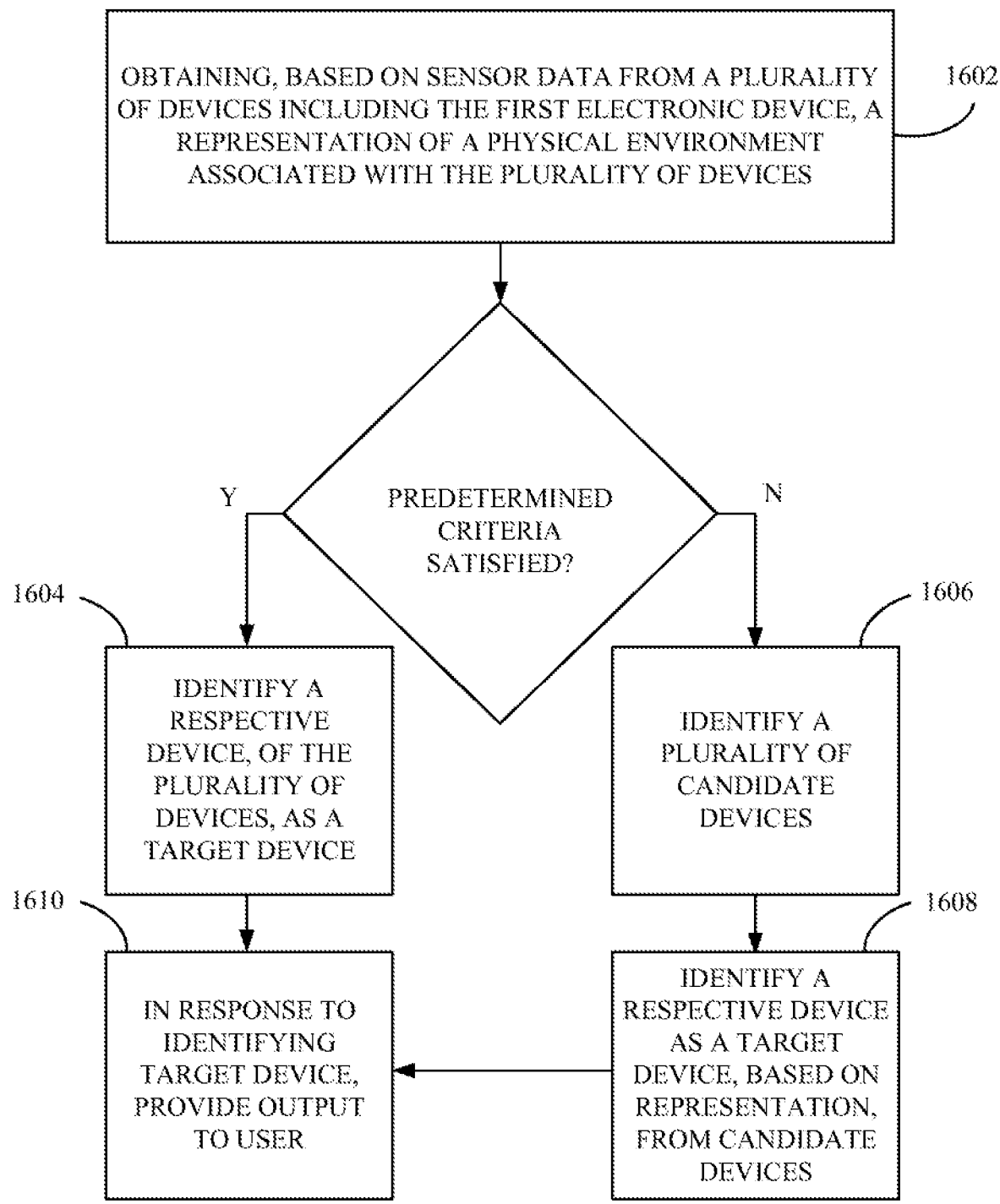
FIG. 16 illustrates an exemplary process for an integrated sensor framework, according to various examples.

With reference to FIG. 16, at block 1602, first electronic device obtains, based on sensor data from a plurality of devices including the first electronic device, a representation of a physical environment associated with the plurality of devices. In some embodiments, the plurality of devices include one or more of a mobile phone, a tablet computer, a desktop computer, a laptop computer, a home speaker, a television set-top box, and a smart watch.

By gathering sensor data from various home-based devices, the system enhances device functionality by leveraging diverse signals for building an environmental representation. Analyzing these additional signals makes the device more efficient by creating a comprehensive environmental representation, thus assisting the user with locating information. Thus, these features reduce power usage and improve battery life of the device by enabling the user to use the device more quickly and efficiently.

At block 1604, in accordance with a determination that a predetermined criteria is satisfied, first electronic device identifies a respective device of the plurality of devices, wherein the respective device is identified as a target device associated with the first electronic device. In some embodiments, first electronic device identifies a number of devices of the plurality of devices, wherein the number corresponds to a number of devices having a specific connection to the first electronic device, and determines that the predetermined criteria is satisfied when the number corresponds to one. In some embodiments, first electronic device identifies a number of devices of the plurality of devices, wherein the number corresponds to a number of devices having a plurality of specific connections to the first electronic device, and determines that the predetermined criteria is satisfied when the number corresponds to one.

By using device connections to determine a target device, the system enhances device functionality by using a first filtering layer in device selection. Device filtering makes the framework more efficient by eliminating unnecessary computations when only a single device is available. Thus, these features reduce power usage and improve battery life of the device by enabling the user to use the device more quickly and efficiently.

At block 1606, in accordance with a determination that the predetermined criteria is not satisfied, first electronic device identifies a plurality of candidate devices of the plurality of devices. In some embodiments, first electronic device determines that the predetermined criteria is not satisfied when the number of devices having a specific connection to the first electronic device does not correspond to one. In some embodiments, first electronic device determines that the predetermined criteria is not satisfied when the number of devices having a plurality of specific connections to the first electronic device does not correspond to one. In some embodiments, the plurality of specific connections include a wireless communication connection and ultrasonic signal reception. In some embodiments, identifying a plurality of candidate devices of the plurality of devices includes identifying particular devices having a specific connection to the first electronic device, and for each particular device, determining a distance between the particular device and the first electronic device.

By using distance between devices for device selection, the system enhances device functionality by using relevant criteria. Device filtering based on distance makes the framework more efficient by focusing on relevant devices when a plurality of candidate devices are available. Thus, these features reduce power usage and improve battery life of the device by enabling the user to use the device more quickly and efficiently.

At block 1608, first electronic device identifies, from the plurality of candidate devices and based on the representation of the physical environment, a respective device, wherein the respective device is selected as a target device associated with the first electronic device. In some embodiments, identifying a respective device includes determining, from the plurality of candidate devices, a candidate device having a closest distance to the first electronic device, and identifying the determined candidate device as the respective device. In some embodiments, for each respective candidate device of the plurality of candidate devices, first electronic device determines a connection parameter corresponding to a connection between the first electronic device and the respective candidate device, wherein the distance between the respective candidate device and the first electronic device is based on the connection parameter. In some embodiments, for each respective candidate device of the plurality of candidate devices, first electronic device identifies, based on the representation of the physical environment, a first position of the respective candidate device and a second position the first electronic device, wherein the distance between the respective candidate device and the first electronic device is based on the first position and the second position.

By using device connection for device selection, the system enhances device functionality by using relevant criteria. Device filtering based on connection information makes the framework more efficient by focusing on relevant devices when a plurality of candidate devices are available. Thus, these features reduce power usage and improve battery life of the device by enabling the user to use the device more quickly and efficiently.

At block 1610, in response to identifying the target device, an output is provided to the user. In some embodiments, providing an output to the user includes identifying a message created by another user, and causing the identified message to be output at the target device. In some embodiments, the message created by another user is created at the target device. In some embodiments, causing the identified message to be output at the target device includes converting a textual representation into an audible representation, wherein the output at the target device includes the audible representation. In some embodiments, the message created by another user includes speech from the another user, and the output at the target device includes the speech from the another user. In some embodiments, providing an output to the user includes providing an output at the first electronic device, wherein the output includes at least one of a displayed output, an audible output, and a haptic output. In some embodiments, providing an output to the user includes identifying information corresponding to a particular device of the plurality of devices, and causing the identified information to be output at the target device. In some embodiments, providing an output to the user includes identifying media parameters corresponding to the first electronic device, determining media content based on the media parameters, and causing the media content to be output at the target device.

By facilitating messaging using the sensor framework, the system enhances device functionality by providing an efficient communication method for users. Efficient and novel communication makes the device more effective reducing traffic for conventional messaging. Thus, these features reduce power usage and improve battery life of the device by enabling the user to use the device more quickly and efficiently.

The operations described above with reference to FIGS. 13-16 are optionally implemented by components depicted in FIGS. 1-4, 6A-6B, and 7A-7C. For example, the operations of process 1100 may be implemented by one or more of operating system 718, applications module 724, I/O processing module 728, STT processing module 730, natural language processing module 732, vocabulary index 744, task flow processing module 736, service processing module 738, media service(s) 120-1, or processor(s) 220, 410, and 704. It would be clear to a person having ordinary skill in the art how other processes are implemented based on the components depicted in FIGS. 1-4, 6A-6B, and 7A-7C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve multi-device communication using the integrated sensor framework. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, personal information such as eye gaze or speech direction can be utilized. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide personal data such as eye gaze or head orientation information. In yet another example, users can select to limit detail provided with respect to personal preferences. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, providing improved device communication using the integrated sensor framework may be accomplished on non-personal information data or a bare minimum amount of personal information, such as anonymized eye gaze, other non-personal information available to the integrated sensor framework, or publicly available information.

What is claimed is:

1. A first electronic device, comprising:
one or more processors;
a memory; and
one or more programs, wherein the one or more programs are stored in the memory and configured to be executed by the one or more processors, the one or more programs including instructions for:
receiving at least one input including sensor data from a second electronic device;
obtaining, based on sensor data from the first electronic device and the sensor data from the second electronic device, a representation of a physical environment associated with the first electronic device;
identifying movement information corresponding to movement of an object within the physical environment;
determining, based on the identified movement information and the representation of the physical environment, event information corresponding to activity within the physical environment; and
providing an output based on the event information.

2. The electronic device of claim 1, wherein the sensor data from the second electronic device includes at least one of a distance between the second electronic device and the object, a movement trajectory of the object, a gaze direction of a person within the physical environment, audio content, and a speech direction.

3. The electronic device of claim 1, wherein obtaining the representation of the physical environment comprises:
generating, based on a plurality of sets of sensor data from a plurality of devices, a multi-dimensional representation of the physical environment, wherein the multi-dimensional representation of the physical environment includes a plurality of locations corresponding to a plurality of objects identified based on the plurality of sets of sensor data.

4. The electronic device of claim 3, wherein the representation of the physical environment includes at least one approximation of a wall boundary within the physical environment.

5. The electronic device of claim 1, the one or more programs including instructions for:
identifying, from the at least one input, sensor data including identification of a plurality of respective objects within the physical environment, wherein
the plurality of respective objects are not electronic devices, and
the representation includes a plurality of identifiers corresponding to the plurality of respective objects.

6. The electronic device of claim 1, the one or more programs including instructions for:
identifying, from the at least one input, sensor data including a device location corresponding to a respective device within the physical environment; and
determining, based on the device location, an approximation of a second object adjacent to the respective device, wherein the representation of the physical environment includes the approximation.

7. The electronic device of claim 1, the one or more programs including instructions for:
receiving a user input corresponding to a respective object, wherein the user input includes an indication that the respective object is lost;
identifying movement information corresponding to movement of the respective object; and
providing, as the output, an indication that the respective object is found and a location of the respective object.

8. The electronic device of claim 1, the one or more programs including instructions for:
receiving, as sensor data from a respective device, authentication information corresponding to a user of the respective device; and
while identifying movement information corresponding to movement of the respective device, maintaining an authentication corresponding to the user in accordance with a determination that a predetermined criteria is satisfied.

9. The electronic device of claim 1, wherein the object corresponds to one of a person, the first electronic device, or a different electronic device.

10. The electronic device of claim 1, wherein identifying movement information corresponding to movement of an object within the physical environment comprises:
during a period of time, tracking movement of an object around the physical environment based on sensor data from a plurality of devices.

11. The electronic device of claim 1, wherein providing an output based on the event information comprises:
sending information to the second electronic device; and
causing the output to be provided at the second electronic device based on the sent information.

12. The electronic device of claim 1, the one or more programs including instructions for:
identifying, based on the at least one input, an unknown object, wherein the event information corresponding to activity within the physical environment includes an identification that the unknown object corresponds to an unknown person; and
providing, as the output, an indication of the unknown person.

13. The electronic device of claim 1, the one or more programs including instructions for:
in accordance with a determination that the event information satisfies a predetermined criteria, causing a respective device to provide a respective output.

14. The electronic device of claim 1, the one or more programs including instructions for:
in accordance with a determination that the event information includes identification of a specific person, providing a content recommendation based on the specific person.

15. A non-transitory computer-readable storage medium storing one or more programs, the one or more programs configured to be executed by one or more processors of a first electronic device, the one or more programs including instructions for:
receiving at least one input including sensor data from a second electronic device;
obtaining, based on sensor data from the first electronic device and the sensor data from the second electronic device, a representation of a physical environment associated with the first electronic device;
identifying movement information corresponding to movement of an object within the physical environment;

determining based on the identified movement information and the representation of the physical environment, event information corresponding to activity within the physical environment; and providing an output based on the event information.

16. A computer-implemented method, comprising:
at a first electronic device with one or more processors and memory:
receiving at least one input including sensor data from a second electronic device;
obtaining, based on sensor data from the first electronic device and the sensor data from the second electronic device, a representation of a physical environment associated with the first electronic device;
identifying movement information corresponding to movement of an object within the physical environment;
determining, based on the identified movement information and the representation of the physical environment, event information corresponding to activity within the physical environment; and
providing an output based on the event information.

17. The computer-readable storage medium of claim 15, wherein the sensor data from the second electronic device includes at least one of a distance between the second electronic device and the object, a movement trajectory of the object, a gaze direction of a person within the physical environment, audio content, and a speech direction.

18. The computer-readable storage medium of claim 15, wherein obtaining the representation of the physical environment comprises:
generating, based on a plurality of sets of sensor data from a plurality of devices, a multi-dimensional representation of the physical environment, wherein the multi-dimensional representation of the physical environment includes a plurality of locations corresponding to a plurality of objects identified based on the plurality of sets of sensor data.

19. The computer-readable storage medium of claim 18, wherein the representation of the physical environment includes at least one approximation of a wall boundary within the physical environment.

20. The computer-readable storage medium of claim 15, the one or more programs including instructions for:
identifying, from the at least one input, sensor data including identification of a plurality of respective objects within the physical environment, wherein
the plurality of respective objects are not electronic devices, and
the representation includes a plurality of identifiers corresponding to the plurality of respective objects.

21. The computer-readable storage medium of claim 15, the one or more programs including instructions for:
identifying, from the at least one input, sensor data including a device location corresponding to a respective device within the physical environment; and
determining, based on the device location, an approximation of a second object adjacent to the respective device, wherein the representation of the physical environment includes the approximation.

22. The computer-readable storage medium of claim 15, the one or more programs including instructions for:
receiving a user input corresponding to a respective object, wherein the user input includes an indication that the respective object is lost;
identifying movement information corresponding to movement of the respective object; and
providing, as the output, an indication that the respective object is found and a location of the respective object.

23. The computer-readable storage medium of claim 15, the one or more programs including instructions for:
receiving, as sensor data from a respective device, authentication information corresponding to a user of the respective device; and
while identifying movement information corresponding to movement of the respective device, maintaining an authentication corresponding to the user in accordance with a determination that a predetermined criteria is satisfied.

24. The computer-readable storage medium of claim 15, wherein the object corresponds to one of a person, the first electronic device, or a different electronic device.

25. The computer-readable storage medium of claim 15, wherein identifying movement information corresponding to movement of an object within the physical environment comprises:
during a period of time, tracking movement of an object around the physical environment based on sensor data from a plurality of devices.

26. The computer-readable storage medium of claim 15, wherein providing an output based on the event information comprises:
sending information to the second electronic device; and
causing the output to be provided at the second electronic device based on the sent information.

27. The computer-readable storage medium of claim 15, the one or more programs including instructions for:
identifying, based on the at least one input, an unknown object, wherein the event information corresponding to activity within the physical environment includes an identification that the unknown object corresponds to an unknown person; and
providing, as the output, an indication of the unknown person.

28. The computer-readable storage medium of claim 15, the one or more programs including instructions for:
in accordance with a determination that the event information satisfies a predetermined criteria, causing a respective device to provide a respective output.

29. The computer-readable storage medium of claim 15, the one or more programs including instructions for:
in accordance with a determination that the event information includes identification of a specific person, providing a content recommendation based on the specific person.

30. The method of claim 16, wherein the sensor data from the second electronic device includes at least one of a distance between the second electronic device and the object, a movement trajectory of the object, a gaze direction of a person within the physical environment, audio content, and a speech direction.

31. The method of claim 16, wherein obtaining the representation of the physical environment comprises:
generating, based on a plurality of sets of sensor data from a plurality of devices, a multi-dimensional representation of the physical environment, wherein the multi-dimensional representation of the physical environment includes a plurality of locations corresponding to a plurality of objects identified based on the plurality of sets of sensor data.

32. The method of claim 31, wherein the representation of the physical environment includes at least one approximation of a wall boundary within the physical environment.

33. The method of claim 16, comprising:
identifying, from the at least one input, sensor data including identification of a plurality of respective objects within the physical environment, wherein
the plurality of respective objects are not electronic devices, and
the representation includes a plurality of identifiers corresponding to the plurality of respective objects.

34. The method of claim 16, comprising:
identifying, from the at least one input, sensor data including a device location corresponding to a respective device within the physical environment; and
determining, based on the device location, an approximation of a second object adjacent to the respective device, wherein the representation of the physical environment includes the approximation.

35. The method of claim 16, comprising:
receiving a user input corresponding to a respective object, wherein the user input includes an indication that the respective object is lost;
identifying movement information corresponding to movement of the respective object; and
providing, as the output, an indication that the respective object is found and a location of the respective object.

36. The method of claim 16, comprising:
receiving, as sensor data from a respective device, authentication information corresponding to a user of the respective device; and
while identifying movement information corresponding to movement of the respective device, maintaining an authentication corresponding to the user in accordance with a determination that a predetermined criteria is satisfied.

37. The method of claim 16, wherein the object corresponds to one of a person, the first electronic device, or a different electronic device.

38. The method of claim 16, wherein identifying movement information corresponding to movement of an object within the physical environment comprises:
during a period of time, tracking movement of an object around the physical environment based on sensor data from a plurality of devices.

39. The method of claim 16, wherein providing an output based on the event information comprises:
sending information to the second electronic device; and
causing the output to be provided at the second electronic device based on the sent information.

40. The method of claim 16, comprising:
identifying, based on the at least one input, an unknown object, wherein the event information corresponding to activity within the physical environment includes an identification that the unknown object corresponds to an unknown person; and
providing, as the output, an indication of the unknown person.

41. The method of claim 16, comprising:
in accordance with a determination that the event information satisfies a predetermined criteria, causing a respective device to provide a respective output.

42. The method of claim 16, comprising:
in accordance with a determination that the event information includes identification of a specific person, providing a content recommendation based on the specific person.

* * * * *